United States Patent
Morton et al.

(10) Patent No.: US 9,891,314 B2
(45) Date of Patent: Feb. 13, 2018

(54) ULTRA WIDE BAND DETECTORS

(71) Applicant: Rapiscan Systems, Inc., Torrance, CA (US)

(72) Inventors: Edward James Morton, Guildford (GB); Anthony J. Peyton, Bromley Cross (GB)

(73) Assignee: Rapiscan Systems, Inc., Torrance, CA (US)

( * ) Notice: Subject to any disclaimer, the term of this patent is extended or adjusted under 35 U.S.C. 154(b) by 124 days.

(21) Appl. No.: 14/639,956

(22) Filed: Mar. 5, 2015

(65) Prior Publication Data

US 2015/0253422 A1   Sep. 10, 2015

Related U.S. Application Data

(60) Provisional application No. 61/949,775, filed on Mar. 7, 2014.

(51) Int. Cl.
| | | |
|---|---|---|
| G01S 13/88 | (2006.01) | |
| G01R 27/00 | (2006.01) | |
| G01V 8/00 | (2006.01) | |
| G01S 13/02 | (2006.01) | |
| G01S 13/87 | (2006.01) | |

(52) U.S. Cl.
CPC ........ G01S 13/887 (2013.01); G01S 13/0209 (2013.01); G01S 13/87 (2013.01); G01V 8/005 (2013.01)

(58) Field of Classification Search
CPC combination set(s) only.
See application file for complete search history.

(56) References Cited

U.S. PATENT DOCUMENTS

| | | | |
|---|---|---|---|
| 3,655,013 A | 4/1972 | Weller | |
| 3,660,663 A * | 5/1972 | Guildford | H04N 7/005 250/235 |
| 3,678,278 A | 7/1972 | Peil | |
| 3,780,291 A | 12/1973 | Stein | |
| 3,790,799 A | 2/1974 | Stein | |
| 3,843,881 A | 10/1974 | Barton | |
| 3,884,816 A | 5/1975 | Takahashi | |
| 3,919,467 A | 11/1975 | Peugeot | |
| 3,924,064 A | 12/1975 | Nomura | |
| 3,961,186 A | 6/1976 | Leunbach | |

(Continued)

FOREIGN PATENT DOCUMENTS

| | | |
|---|---|---|
| CN | 1490616 | 4/2004 |
| CN | 1715895 | 1/2006 |

(Continued)

OTHER PUBLICATIONS

International Search Report for PCT/US15/19049, dated Jun. 17, 2015.

(Continued)

*Primary Examiner* — Minh Phan
(74) *Attorney, Agent, or Firm* — Novel IP

(57) ABSTRACT

An ultra-wide band microwave based personnel/passenger screening system, and in particular, a system for material specific detection, uses non-ionizing radiation in which focused beams of low intensity microwave radiation are projected in rapid succession at an individual as they walk through a portal.

33 Claims, 7 Drawing Sheets

(56) References Cited

U.S. PATENT DOCUMENTS

| | | |
|---|---|---|
| 3,971,948 A | 7/1976 | Pfeiler |
| 3,990,175 A | 11/1976 | Conway |
| 4,008,400 A | 2/1977 | Brunnett |
| 4,020,346 A | 4/1977 | Dennis |
| 4,031,545 A | 6/1977 | Stein |
| 4,047,035 A | 9/1977 | Dennhoven |
| 4,064,440 A | 12/1977 | Roder |
| 4,070,576 A | 1/1978 | Cobb |
| 4,107,532 A | 8/1978 | Macovski |
| 4,112,301 A | 9/1978 | Annis |
| 4,139,771 A | 2/1979 | Dennhoven |
| 4,160,165 A | 7/1979 | McCombs |
| 4,179,100 A | 12/1979 | Sashin |
| 4,196,352 A | 4/1980 | Berninger |
| 4,200,800 A | 4/1980 | Swift |
| 4,228,353 A | 10/1980 | Johnson |
| 4,228,357 A | 10/1980 | Annis |
| 4,242,583 A | 12/1980 | Annis |
| 4,242,588 A | 12/1980 | Huang |
| 4,260,898 A | 4/1981 | Annis |
| 4,298,800 A | 11/1981 | Goldman |
| 4,303,830 A | 12/1981 | Heinzelmann |
| 4,342,914 A | 8/1982 | Bjorkholm |
| 4,349,739 A | 9/1982 | Annis |
| 4,357,535 A | 11/1982 | Haas |
| 4,366,382 A | 12/1982 | Kotowski |
| 4,366,576 A | 12/1982 | Annis |
| 4,380,817 A | 4/1983 | Harding |
| 4,389,729 A | 6/1983 | Stein |
| 4,414,682 A | 11/1983 | Annis |
| 4,422,177 A | 12/1983 | Mastronardi |
| 4,426,721 A | 1/1984 | Wang |
| 4,454,605 A | 6/1984 | Delucia |
| 4,472,822 A | 9/1984 | Swift |
| 4,503,332 A | 3/1985 | Annis |
| 4,514,691 A | 4/1985 | De |
| 4,525,854 A | 6/1985 | Molbert |
| 4,535,245 A | 8/1985 | Zonneveld |
| 4,549,307 A | 10/1985 | Macovski |
| 4,578,806 A | 3/1986 | Grass |
| 4,586,441 A | 5/1986 | Zekich |
| 4,598,415 A | 7/1986 | Luccio |
| 4,672,837 A | 6/1987 | Cottrell |
| 4,692,937 A | 9/1987 | Sashin |
| 4,711,994 A | 12/1987 | Greenberg |
| 4,736,401 A | 4/1988 | Donges |
| 4,745,631 A | 5/1988 | Paolini |
| 4,756,015 A | 7/1988 | Doenges |
| 4,759,047 A | 7/1988 | Donges |
| 4,768,214 A | 8/1988 | Bjorkholm |
| 4,783,794 A | 11/1988 | Dietrich |
| 4,799,247 A | 1/1989 | Annis |
| 4,807,637 A | 2/1989 | Bjorkholm |
| 4,809,312 A | 2/1989 | Annis |
| 4,817,121 A | 3/1989 | Shimizu |
| 4,819,256 A | 4/1989 | Annis |
| 4,821,023 A | 4/1989 | Parks |
| 4,825,454 A | 4/1989 | Annis |
| 4,839,913 A | 6/1989 | Annis |
| 4,841,555 A | 6/1989 | Doi |
| 4,845,769 A | 7/1989 | Burstein |
| 4,864,142 A | 9/1989 | Gomberg |
| 4,870,670 A | 9/1989 | Geus |
| 4,884,289 A | 11/1989 | Glockmann |
| 4,890,310 A | 12/1989 | Umetani |
| 4,893,015 A | 1/1990 | Kubierschky |
| 4,894,619 A | 1/1990 | Leinonen |
| 4,899,283 A | 2/1990 | Annis |
| 4,961,214 A | 10/1990 | Van |
| 4,974,247 A | 11/1990 | Friddell |
| 4,979,137 A | 12/1990 | Gerstenfeld |
| 4,995,066 A | 2/1991 | Harding |
| 5,007,072 A | 4/1991 | Jenkins |
| 5,022,062 A | 6/1991 | Annis |
| 5,033,073 A | 7/1991 | Friddell |
| 5,038,370 A | 8/1991 | Harding |
| 5,039,981 A | 8/1991 | Rodriguez |
| 5,044,002 A | 8/1991 | Stein |
| 5,084,619 A | 1/1992 | Pfeiler |
| 5,115,459 A | 5/1992 | Bertozzi |
| 5,120,706 A | 6/1992 | Weeks |
| 5,121,105 A | 6/1992 | Aittoniemi |
| 5,127,030 A | 6/1992 | Annis |
| 5,132,995 A | 7/1992 | Stein |
| 5,156,270 A | 10/1992 | Kachel |
| 5,179,581 A | 1/1993 | Annis |
| 5,181,234 A | 1/1993 | Smith |
| 5,182,764 A | 1/1993 | Peschmann |
| 5,212,720 A | 5/1993 | Landi |
| 5,224,144 A | 6/1993 | Annis |
| 5,227,800 A * | 7/1993 | Huguenin ............... G01S 7/024 |
| | | 250/332 |
| 5,243,693 A | 9/1993 | Maron |
| 5,247,561 A | 9/1993 | Kotowski |
| 5,253,283 A | 10/1993 | Annis |
| 5,260,982 A | 11/1993 | Fujii |
| 5,313,511 A | 5/1994 | Annis |
| 5,367,552 A | 11/1994 | Peschmann |
| 5,394,454 A | 2/1995 | Harding |
| 5,397,986 A | 3/1995 | Conway |
| 5,420,905 A | 5/1995 | Bertozzi |
| 5,430,787 A | 7/1995 | Norton |
| 5,463,224 A | 10/1995 | Burstein |
| 5,483,569 A | 1/1996 | Annis |
| 5,490,218 A | 2/1996 | Krug |
| 5,493,596 A | 2/1996 | Annis |
| 5,503,424 A | 4/1996 | Agopian |
| 5,524,133 A | 6/1996 | Neale |
| 5,528,656 A | 6/1996 | Annis |
| 5,572,121 A | 11/1996 | Beswick |
| 5,579,360 A | 11/1996 | Abdel-Mottaleb |
| 5,590,057 A | 12/1996 | Fletcher |
| 5,600,303 A | 2/1997 | Husseiny |
| 5,600,700 A | 2/1997 | Krug |
| 5,602,893 A | 2/1997 | Harding |
| 5,638,420 A | 6/1997 | Armistead |
| 5,642,393 A | 6/1997 | Krug |
| 5,642,394 A | 6/1997 | Rothschild |
| 5,660,549 A | 8/1997 | Witt |
| 5,666,393 A | 9/1997 | Annis |
| 5,692,028 A | 11/1997 | Geus |
| 5,692,029 A | 11/1997 | Husseiny |
| 5,696,806 A | 12/1997 | Grodzins |
| 5,699,400 A | 12/1997 | Lee |
| 5,763,886 A | 6/1998 | Schulte |
| 5,764,683 A | 6/1998 | Swift |
| 5,796,110 A | 8/1998 | An |
| 5,838,758 A | 11/1998 | Krug |
| 5,882,206 A | 3/1999 | Gillio |
| 5,892,840 A | 4/1999 | Jang |
| 5,910,973 A | 6/1999 | Grodzins |
| 5,930,326 A | 7/1999 | Rothschild |
| 5,940,468 A | 8/1999 | Huang |
| 5,966,422 A | 10/1999 | Dafni |
| 5,974,111 A | 10/1999 | Krug |
| 6,018,562 A | 1/2000 | Willson |
| 6,044,353 A | 3/2000 | Pugliese |
| 6,057,761 A | 5/2000 | Yukl |
| 6,081,580 A | 6/2000 | Grodzins |
| 6,094,472 A | 7/2000 | Smith |
| 6,137,895 A | 10/2000 | Al-Sheikh |
| 6,138,815 A | 10/2000 | Reiners |
| 6,151,381 A | 11/2000 | Grodzins |
| 6,192,104 B1 | 2/2001 | Adams |
| 6,212,251 B1 | 4/2001 | Tomura |
| 6,236,709 B1 | 5/2001 | Perry |
| 6,249,567 B1 | 6/2001 | Rothschild |
| 6,269,142 B1 | 7/2001 | Smith |
| 6,272,206 B1 | 8/2001 | Bjorkholm |
| 6,278,115 B1 | 8/2001 | Annis |
| 6,282,264 B1 | 8/2001 | Smith |
| 6,298,603 B1 | 10/2001 | Diaz |
| 6,301,326 B2 | 10/2001 | Bjorkholm |
| 6,301,327 B1 | 10/2001 | Martens |

(56) References Cited

U.S. PATENT DOCUMENTS

| | | |
|---|---|---|
| 6,308,644 B1 | 10/2001 | Diaz |
| 6,315,308 B1 | 11/2001 | Konopka |
| RE37,467 E | 12/2001 | Brasch |
| 6,366,203 B1 | 4/2002 | Burns |
| 6,370,222 B1 | 4/2002 | Cornick |
| 6,375,697 B2 | 4/2002 | Davies |
| 6,393,095 B1 | 5/2002 | Robinson |
| 6,418,194 B1 | 7/2002 | McPherson |
| 6,421,420 B1 | 7/2002 | Grodzins |
| 6,442,233 B1 | 8/2002 | Grodzins |
| 6,459,761 B1 | 10/2002 | Grodzins |
| 6,459,764 B1 | 10/2002 | Chalmers |
| 6,472,984 B1 | 10/2002 | Risi |
| 6,473,487 B1 | 10/2002 | Le |
| 6,484,650 B1 | 11/2002 | Stomski |
| 6,507,278 B1 | 1/2003 | Brunetti |
| 6,543,599 B2 | 4/2003 | Jasinetzky |
| 6,546,072 B1 | 4/2003 | Chalmers |
| 6,552,346 B2 | 4/2003 | Verbinski |
| 6,553,096 B1 | 4/2003 | Zhou |
| 6,556,653 B2 | 4/2003 | Hussein |
| 6,567,496 B1 | 5/2003 | Sychev |
| 6,597,760 B2 | 7/2003 | Beneke |
| 6,610,977 B2 | 8/2003 | Megerle |
| 6,621,888 B2 | 9/2003 | Grodzins |
| 6,628,745 B1 | 9/2003 | Annis |
| 6,634,668 B2 | 10/2003 | Urffer |
| 6,653,588 B1 | 11/2003 | Gillard-Hickman |
| 6,665,373 B1 | 12/2003 | Kotowski |
| 6,674,367 B2 | 1/2004 | Sweatte |
| 6,707,879 B2 | 3/2004 | McClelland |
| 6,721,391 B2 | 4/2004 | McClelland |
| 6,742,301 B1 | 6/2004 | Schwarz |
| 6,745,520 B2 | 6/2004 | Puskaric |
| 6,749,207 B2 | 6/2004 | Nadeau |
| 6,754,304 B1 | 6/2004 | Kumakhov |
| 6,777,684 B1 | 8/2004 | Volkov |
| 6,785,357 B2 | 8/2004 | Bernardi |
| 6,785,360 B1 | 8/2004 | Annis |
| 6,819,109 B2 | 11/2004 | Sowers |
| 6,819,241 B2 | 11/2004 | Turner |
| 6,839,403 B1 | 1/2005 | Kotowski |
| 6,848,826 B2 | 2/2005 | Marie |
| 6,856,667 B2 | 2/2005 | Ellenbogen |
| 6,870,791 B1 | 3/2005 | Caulfield |
| 6,876,719 B2 | 4/2005 | Ozaki |
| 6,879,657 B2 | 4/2005 | Hoffman |
| 6,891,381 B2 | 5/2005 | Bailey |
| 6,899,540 B1 | 5/2005 | Neiderman |
| 6,901,346 B2 | 5/2005 | Tracy |
| 6,911,907 B2 | 6/2005 | Kelliher |
| 6,952,163 B2 | 10/2005 | Huey |
| 6,965,340 B1 | 11/2005 | Baharav |
| 6,967,612 B1 | 11/2005 | Gorman |
| 6,970,086 B2 | 11/2005 | Nelson |
| 6,970,087 B2 | 11/2005 | Stis |
| 6,990,175 B2 | 1/2006 | Nakashima |
| 7,016,459 B2 | 3/2006 | Ellenbogen |
| 7,053,785 B2 | 5/2006 | Akins |
| 7,092,485 B2 | 8/2006 | Kravis |
| 7,103,137 B2 | 9/2006 | Seppi |
| 7,110,493 B1 | 9/2006 | Kotowski |
| 7,110,925 B2 | 9/2006 | Pendergraft |
| 7,114,849 B2 | 10/2006 | Atzinger |
| 7,142,638 B2 | 11/2006 | Polichar |
| 7,162,005 B2 | 1/2007 | Bjorkholm |
| 7,164,747 B2 | 1/2007 | Ellenbogen |
| 7,185,206 B2 | 2/2007 | Goldstein |
| 7,203,276 B2 | 4/2007 | Arsenault |
| 7,257,189 B2 | 8/2007 | Modica |
| 7,263,409 B2 | 8/2007 | LeVasseur |
| 7,265,709 B2 | 9/2007 | Fleisher |
| 7,286,634 B2 | 10/2007 | Sommer |
| 7,305,062 B2 | 12/2007 | Hambuechen |
| 7,305,063 B2 | 12/2007 | Heuscher |
| 7,317,390 B2 | 1/2008 | Huey |
| 7,322,745 B2 | 1/2008 | Agrawal |
| 7,330,529 B2 | 2/2008 | Kautzer |
| 7,333,587 B2 | 2/2008 | De |
| 7,356,115 B2 | 4/2008 | Ford |
| 7,365,672 B2 | 4/2008 | Keller |
| 7,400,701 B1 | 7/2008 | Cason |
| 7,418,077 B2 | 8/2008 | Gray |
| 7,460,636 B2 | 12/2008 | Ein-Gal |
| 7,471,764 B2 | 12/2008 | Kaval |
| 7,476,023 B1 | 1/2009 | Canfield |
| 7,505,557 B2 | 3/2009 | Modica |
| 7,505,562 B2 | 3/2009 | Dinca |
| 7,551,709 B2 | 6/2009 | Schlomka |
| 7,551,715 B2 | 6/2009 | Rothschild |
| 7,558,370 B2 | 7/2009 | Sommer |
| 7,561,666 B2 | 7/2009 | Annis |
| 7,577,234 B2 | 8/2009 | Knoespel |
| 7,593,506 B2 | 9/2009 | Cason |
| 7,593,510 B2 | 9/2009 | Rothschild |
| 7,639,866 B2 | 12/2009 | Pomero |
| 7,660,388 B2 | 2/2010 | Gray |
| 7,684,544 B2 | 3/2010 | Wilson |
| 7,783,004 B2 | 8/2010 | Kotowski |
| 7,796,394 B2 | 9/2010 | Wang |
| 7,796,733 B2 | 9/2010 | Hughes |
| 7,796,734 B2 | 9/2010 | Mastronardi |
| 7,806,589 B2 | 10/2010 | Tashman |
| 7,809,109 B2 | 10/2010 | Mastronardi |
| 7,817,776 B2 | 10/2010 | Agrawal |
| 7,826,589 B2 | 11/2010 | Kotowski |
| 7,984,940 B2 | 7/2011 | Chen |
| 8,003,949 B2 | 8/2011 | Ryge |
| 8,054,938 B2 | 11/2011 | Kaval |
| 8,116,575 B1 | 2/2012 | Saisan |
| 8,135,112 B2 | 3/2012 | Hughes |
| 8,199,996 B2 | 6/2012 | Hughes |
| 8,576,982 B2 | 11/2013 | Gray |
| 8,576,989 B2 | 11/2013 | Kaminski |
| 8,638,904 B2 | 1/2014 | Gray |
| 8,654,922 B2 | 2/2014 | Bendahan |
| 8,731,137 B2 | 5/2014 | Arroyo |
| 8,995,619 B2 | 3/2015 | Gray |
| 2001/0021241 A1 | 9/2001 | Swift |
| 2002/0045152 A1 | 4/2002 | Viscardi |
| 2003/0012338 A1 | 1/2003 | Lienard |
| 2003/0025302 A1 | 2/2003 | Urffer |
| 2003/0171939 A1 | 9/2003 | Yagesh |
| 2003/0214407 A1 | 11/2003 | Sweatte |
| 2003/0225612 A1 | 12/2003 | Desimone |
| 2003/0229506 A1 | 12/2003 | Scott |
| 2004/0051265 A1 | 3/2004 | Nadeau |
| 2004/0088584 A1 | 5/2004 | Shachar |
| 2004/0109532 A1 | 6/2004 | Ford |
| 2004/0120454 A1 | 6/2004 | Ellenbogen |
| 2004/0125914 A1 | 7/2004 | Kang |
| 2004/0175018 A1 | 9/2004 | MacArthur |
| 2004/0252024 A1 | 12/2004 | Huey |
| 2005/0024199 A1 | 2/2005 | Huey |
| 2005/0074086 A1 | 4/2005 | Pendergraft |
| 2005/0100135 A1 | 5/2005 | Lowman |
| 2005/0276379 A1 | 12/2005 | Polichar |
| 2006/0182223 A1 | 8/2006 | Heuscher |
| 2006/0262902 A1 | 11/2006 | Wattenburg |
| 2007/0009088 A1 | 1/2007 | Edic |
| 2007/0058037 A1 | 3/2007 | Bergeron |
| 2007/0086564 A1 | 4/2007 | Bruder |
| 2007/0098142 A1 | 5/2007 | Rothschild |
| 2007/0139248 A1* | 6/2007 | Baharav .............. G01S 13/89 342/22 |
| 2007/0172026 A1 | 7/2007 | Schlomka |
| 2007/0235652 A1 | 10/2007 | Smith |
| 2008/0144777 A1 | 6/2008 | Wilson |
| 2008/0212742 A1 | 9/2008 | Hughes |
| 2009/0041186 A1 | 2/2009 | Gray |
| 2009/0074138 A1 | 3/2009 | Knoespel |
| 2009/0082762 A1 | 3/2009 | Ormsby |
| 2009/0103686 A1 | 4/2009 | Rothschild |
| 2009/0116614 A1 | 5/2009 | Kotowski |

(56) References Cited

U.S. PATENT DOCUMENTS

| | | | |
|---|---|---|---|
| 2009/0116617 A1 | 5/2009 | Mastronardi | |
| 2009/0167042 A1 | 7/2009 | Chen | |
| 2009/0245462 A1 | 10/2009 | Agrawal | |
| 2009/0252295 A1 | 10/2009 | Foland | |
| 2009/0257555 A1 | 10/2009 | Chalmers | |
| 2010/0034451 A1 | 2/2010 | Hughes | |
| 2010/0067654 A1 | 3/2010 | Kotowski | |
| 2010/0158191 A1 | 6/2010 | Gray | |
| 2011/0017917 A1 | 1/2011 | Mastronardi | |
| 2011/0080999 A1 | 4/2011 | Kaval | |
| 2011/0081099 A1 | 4/2011 | Hughes | |
| 2011/0096901 A1 | 4/2011 | Kotowski | |
| 2011/0102235 A1 | 5/2011 | Abdillah | |
| 2011/0129063 A1 | 6/2011 | Bendahan | |
| 2011/0164726 A1 | 7/2011 | Mastronardi | |
| 2011/0273320 A1 | 11/2011 | Nogueira-Nine | |
| 2011/0274249 A1 | 11/2011 | Gray | |
| 2011/0274250 A1 | 11/2011 | Gray | |
| 2011/0293072 A1 | 12/2011 | Kaminski | |
| 2011/0299659 A1 | 12/2011 | Gray | |
| 2012/0103061 A1 | 5/2012 | Nacson | |
| 2014/0028457 A1 | 1/2014 | Reinpoldt | |
| 2014/0063239 A1 | 3/2014 | Furness | |
| 2014/0339430 A1* | 11/2014 | Hillis | G01N 23/04 250/358.1 |
| 2016/0116581 A1* | 4/2016 | Mohamadi | G01S 7/411 342/21 |

FOREIGN PATENT DOCUMENTS

| | | |
|---|---|---|
| CN | 1764987 | 4/2006 |
| CN | 1802676 | 7/2006 |
| CN | 1846151 | 10/2006 |
| CN | 101083757 | 12/2007 |
| CN | 101379415 | 3/2009 |
| CN | 101644687 | 2/2010 |
| CN | 101071109 | 5/2010 |
| CN | 101467071 | 6/2012 |
| CN | 101185006 | 1/2013 |
| EP | 0261984 A2 | 3/1988 |
| EP | 0533316 | 3/1993 |
| EP | 2548011 | 1/2013 |
| EP | 2548012 | 1/2013 |
| JP | H4313052 | 11/1992 |
| JP | H6265485 | 9/1994 |
| JP | H10185842 | 7/1998 |
| JP | 2004251624 | 9/2004 |
| JP | 2007532876 | 11/2007 |
| WO | 1988000698 | 1/1988 |
| WO | 1992002937 | 2/1992 |
| WO | 1999021148 | 4/1999 |
| WO | 2005098400 | 10/2005 |
| WO | 2009006044 | 1/2009 |
| WO | 2009082762 | 7/2009 |
| WO | 2009082762 A1 | 7/2009 |
| WO | 2011115923 A1 | 9/2011 |
| WO | 2011115930 A2 | 9/2011 |
| WO | 2011115934 A2 | 9/2011 |
| WO | 2011115935 A1 | 9/2011 |
| WO | 2013011282 | 1/2013 |
| WO | 2014058495 | 4/2014 |
| WO | 2015134802 | 9/2015 |

OTHER PUBLICATIONS

CRS Report for Congress, Aviation Security Technologies and Procedures: Screening Passengers and Baggage, Oct. 26, 2001, pp. 1-12.
International Search Report for PCT/US06/00623, dated Feb. 27, 2008, International Search Authority, pp. 12-13 of the report analyzes the materiality of certain references.
First Office Action for CA2710655, dated Mar. 30, 2015.
Second Office Action for CA2710655, dated Nov. 12, 2015.
Supplementary European Search Report for EP08865209, dated Oct. 7, 2016.
First Office Action for Japanese Application No. JP2014081207, dated Feb. 5, 2015.
International Search Report for PCT/US2008/067619, Rapiscan Security Products., Aug. 20, 2008.
International Search Report for PCT/US2008/088345, Rapiscan Security Products., Apr. 3, 2009.
Rapiscan Security Products, Secure 1000 Concealed Object Detection System, Nov. 1998.
ANSI, Radiation Safety for Personnel Security Screening Systems Using X-Rays, Apr. 3, 2002.
Rapiscan Security Products, Secure 1000 Brochure, 2002.
Daniel Strom, "Screening Individuals with Backscatter X-Ray Systems", Health Physics Society, Feb. 3, 2005.
Rapiscan Systems Secure 1000 Case Study, London Heathrow Terminal 4, Fall 2004.
MSNBC, "Airports Seek Hi-Tech Security", Apr. 3, 2002.
St. Bartholomew's Hospital, Radiation Safety Report on the Rapiscan Secure 1000 X-Ray System, Nov. 4, 2004.
Gerald J. Smith, 'Bodysearch Technology Uses X-ray Imaging to Remove Hazards and Humiliation from Personnel Searches', IEEE, 1995.
Murray et al., 'Exploitation of X-Ray Technology for the Detection of Contraband-Aviation Security Applications', European Conference on Security and Detection, Apr. 28-30, 1997.
International Search Report, PCT/US2008/067619, dated Aug. 20, 2008, Rapiscan Security Products.
International Search Report, PCT/US2008/088345, dated Apr. 3, 2009, Rapiscan Security Products.
First office action for, CN201210289718, dated 2012.
First Exam Report for CA2692139, dated Jan. 28, 2015.
Office Action for CA2692139, dated Oct. 7, 2015.
International Search Report, PCT/US11/28411, dated Sep. 27, 2011, Rapiscan Systems Inc.
International Search Report, PCT/US11/28393, dated Jul. 8, 2011, Rapiscan Systems Inc.
International Search Report, PCT/US11/28413, dated Jul. 22, 2011, Rapiscan Systems Inc.
Notice of Allowance dated Feb. 10, 2015 for U.S. Appl. No. 14/047,583.
First office action for Chinese Application No. CN 201180024005.2, dated Jun. 23, 2014.
International Search Report, PCT/US11/28403, dated Oct. 11, 2011, Rapiscan Systems Inc.
Fourth office action for Chinese Application No. CN 201180024005.2, dated Apr. 5, 2016.
Examination Report for GB1215673.3, dated Dec. 24, 2015.
First Office Action for Chinese Application No. 2011800241163, dated Nov. 2014.
Office Action dated Feb. 20, 2015 for U.S. Appl. No. 14/047,604.
Office Action dated Aug. 10, 2015 for U.S. Appl. No. 14/531,485.
Notice of Allowance dated Nov. 10, 2015 for U.S. Appl. No. 14/531,485.
Notice of Allowance dated Jun. 23, 2015 for U.S. Appl. No. 14/047,604.
Examination Report for GB1215694.9, dated May 16, 2016.
Office Action dated Nov. 30, 2016 for U.S. Appl. No. 13/942,563.
International Search Report for PCT/US13/50559, dated Mar. 27, 2014.
Second office action for Chinese Application No. CN201180021243.8, dated Jan. 6, 2015.
Third office action for Chinese Application No. CN201180021243.8, dated Aug. 31, 2015.
Notice of Allowance dated Feb. 3, 2015 for U.S. Appl. No. 14/249,657.
Examination Report for application No. GB20120015372, dated Oct. 23, 2014.
Examination Report for GB1215691.5, dated May 16, 2016.
Examination Report for GB1215679.0, dated May 16, 2016.

* cited by examiner

ULTRA WIDE BAND DETECTORS

CROSS-REFERENCE

The present specification relies on U.S. Patent Provisional No. 61/949,775, entitled "Ultra-Wide Band Detectors" and filed on Mar. 7, 2014, for priority. U.S. Patent Provisional No. 61/949,775 is hereby incorporated by reference in its entirety.

FIELD

The present specification generally relates to a personnel screening system, and in particular, relates to a system for material specific detection using non-ionizing radiation in which focused beams of low intensity microwave radiation are projected in rapid succession at individuals as they walk through a portal.

BACKGROUND

Terrorism poses a threat to the travelling public. Threat devices, such as weapons, or threat materials, such as explosives, may be carried in pockets or strapped to the body with little probability of detection by casual, or even skilled, observers. Therefore, it has become common practice to require the travelers to divest themselves of outer garments, belts, wallets, jewelry, mobile phones, and shoes when entering or passing through a critical facility such as an airport, train depot, or public building. The divesting procedure is time consuming and inconvenient for members of the public and is expensive to manage for the facility operator.

Once divested, the garments and accessories are typically scanned using an X-ray transmission imaging system while the member of the public is scanned by a different piece of technology, such as a millimeter wave imaging system or X-ray backscatter imaging system, to produce images of the body of the person being scanned. The images of the body may contain anomalies caused by items carried by the person. These anomalies may be innocuous items, such as a passport or a handkerchief, or may be significant threats, such as an explosive material. Currently, known technologies require a trained algorithm to analyze the shape of the detected object to determine if it is a threat or if it is innocuous. From the shape alone, however, it is difficult to assess the nature of many potential threats, or indeed innocuous items, and therefore false alarm rates tend to be significant.

Therefore, what is needed is a system for material specific detection using non-ionizing radiation in which focused beams of low intensity microwave radiation are projected in rapid succession at an individual as they walk through a portal.

SUMMARY

The present specification discloses a portal for scanning a passenger walking through an inspection region along a longitudinal axis, wherein the passenger is carrying at least one object on the passenger's body, the portal comprising: a funneled entrance comprising a first set of two opposing panels installed at a first angle to the longitudinal axis, the first angle being in a range of 5 to 85 degrees; a funneled exit comprising a second set of two opposing panels installed at a second angle to the longitudinal axis, the second angle being in a range of 5 to 85 degrees; a central portal comprising a third set of two opposing panels positioned parallel to each other and located between said funneled entrance and funneled exit, wherein the first, second and third sets of two opposing panels form the inspection region and comprise a plurality of transmitter elements to project microwave beams on the passenger as the passenger passes through the portal and a plurality of receiver elements to receive scattered microwave beams from the passenger, and wherein more than one transmitter element is active simultaneously and generates a plurality of scans of the inspection region while the passenger passes through the portal; and a plurality of processing blocks associated with the plurality of transmitter and receiver elements to process the scattered microwave beams and output data comprising at least one of a time, phase or frequency domain information, wherein the scattered microwave beams are a result of interactions of the projected microwave beams with an upper surface of the at least one object, a rear surface of the at least one object, and a portion of the passenger adjacent to the upper surface of the at least one object, and wherein the at least one of time, phase or frequency domain information is used to determine a location, shape, size and/or relative permittivity of the at least one object.

In some embodiments, the first and second sets of the two opposing panels are installed at a first and a second angle to the longitudinal axis, said first and second angles being in a range of 20 to 60 degrees.

In various embodiments, each panel of the first, second and third sets of two opposing panels is approximately 2 m tall and has a width ranging between 0.4 m and 1.0 m.

In accordance with various embodiments the first, second and third sets of the two opposing panels are configured to scan a front surface, a rear surface and a plurality of side surfaces of the passenger.

The present specification also discloses a method of scanning a passenger walking along a longitudinal axis of an inspection region of a portal, wherein the inspection region is defined by a central portal, an entrance funnel, and an exit funnel, wherein the central portal comprises a right panel and a left panel, the right and left panels opposing each other in a substantially parallel configuration, wherein the entrance funnel comprises a first panel positioned at an angle of 5 to 85 degrees to a front end of the right panel of the central region and a second panel positioned at an angle of 5 to 85 degrees to a front end of the left panel of the central region, and wherein the exit funnel comprises a first panel positioned at an angle of 5 to 85 degrees to a back end of the right panel of the central region and a second panel positioned at an angle of 5 to 85 degrees to a back end of the left panel of the central region, the method comprising: projecting RF beams on the passenger from a plurality of transmitter elements on the panels of the central portal, entrance and exit funnels, wherein more than one transmitter element is active simultaneously and generates a plurality of scans of the inspection region while the passenger transits through the portal; receiving scattered beams, from the passenger, by a plurality of receiver elements on the panels of the central portal, entrance and exit funnels, wherein the scattered beams are a result of interactions of the projected RF beams with an upper surface and a rear surface of at least one object located on the passenger's body and with the passenger's body adjacent to the upper surface of the at least one object; and processing the scattered beams, using a plurality of processing blocks associated with the plurality of transmitter and receiver elements, to output data comprising at least one of a time, phase or frequency domain information, wherein the at least one of time, phase or frequency domain information is used to determine a location, shape, size and/or relative permittivity of the at least one object.

In various embodiments, the angle of the first and second panels of each of the entrance and exit funnels ranges between 20 to 60 degrees.

In various embodiments, each panel of the central portal, entrance funnel and exit funnel is approximately 2 m tall and has a width ranging between 0.4 m and 1.0 m.

In accordance with some embodiments, the panels of the central portal, entrance funnel and exit funnel respectively scan a front surface, a rear surface and sides of the passenger, substantially.

The present specification further discloses a method of scanning a passenger walking along a longitudinal axis of an inspection region of a portal, wherein the inspection region is defined by a first, second and third sets of two panels each, and wherein the first and second sets of panels are installed at an angle to the longitudinal axis to respectively form an entrance and an exit of the portal, the method comprising: projecting RF beams on the passenger from a plurality of transmitter elements on the first, second and third sets of panels, wherein more than one transmitter element is active simultaneously and generates a plurality of scans of the inspection region while the passenger transits through the portal; receiving scattered beams, from the passenger, by a plurality of receiver elements on the first, second and third sets of panels, wherein the scattered beams are a result of interactions of the projected RF beams from an upper surface and a rear surface of at least one object located on the passenger's body and from the passenger's body adjacent to the upper surface of the at least one object; and processing the scattered beams, using a plurality of processing blocks associated with the plurality of transmitter and receiver elements, to output data reflective of a time difference between the scattered beams received from the upper surface and the rear surface of the at least one object, wherein the time difference is used to determine a relative permittivity of the at least one object.

In various embodiments, the angle of the first and second sets of panels ranges between 20 to 60 degrees.

In various embodiments, each panel of the first, second and third sets is approximately 2 m tall and has a width ranging between 0.4 m and 1.0 m.

In accordance with some embodiments, the first, second and third sets of panels respectively scan a front surface, a rear surface and sides of the passenger, substantially.

In various embodiments, the plurality of scans of the inspection region is generated at a rate ranging between 5 and 100 frames per second.

In various embodiments, the microwave (or RF) beams have frequencies ranging between 2 GHz and 20 GHz.

In various embodiments, an antenna coupled to each of the plurality of transmitter and receiver elements has a diameter ranging between 1 cm and 10 cm.

In some embodiments, the plurality of transmitter elements is activated in a sequential raster scan pattern.

In some embodiments, the plurality of transmitter elements is activated in a pseudo random scan pattern.

In various embodiments, the at least one object carried on the passenger's body is displayed as an icon superimposed on a real-time video image of the passenger, wherein the icon is colored to indicate a threat status of the at least one object.

In one embodiment, the beams interact with items of suitable length scale (typically of the order of 1 cm to 20 cm) and consequently modify their phase and amplitude as they scatter back to a series of microwave receivers. Each transmitting device projects a narrow pulse in the time domain towards the person under inspection from where interacted pulsed signals propagate to a multiplicity of receivers, capturing signals in parallel. The time at which the signal is detected at each receiver is determined by the distance to the point in three-dimensional (3D) space at which the interaction with the person or item occurred. By collecting all of the projection data together for all receivers and for all of the particular transmitters which emitted the pulses, it is possible to identify both the type of material in which the interaction occurred and the location in 3D space at which it happened. Finally, by analyzing the properties of the interacted signals, it is possible to determine the dielectric constant of the material at the point of interaction, or determine electromagnetic tensor-like characteristics for the object, which describe its electromagnetic behavior, and hence identify the specific type of threat, or innocuous object, that was present.

Using this low frequency microwave radiation interaction, it is not necessary to display an image obtained of the body of the person being scanned, and in one optional embodiment, no image is formed, thereby avoiding the privacy issues that affect known scanning technology. In addition, the data itself is material specific thereby providing good detection probability for threat materials and low false alarm rates for other objects such as mobile phones, watches, passports and other paper based documents.

The method described in the present specification is inherently fast (the microwave interactions occur in timescales of hundreds of picoseconds to tens of nanoseconds) and therefore is well suited to application in real-time scanning systems with automated detection of threat materials at normal walking speed.

By using relatively low frequency radiation (on the order of 1 GHz to 20 GHz), the microwave beam exhibits good penetration through clothing and many other dielectric materials, including damp to wet clothing which is not penetrable at the higher frequencies of known image-based millimeter wave and terahertz-based imaging systems. Using ultra wide band transmitter and receiver antennas, a broad spectrum of wavelengths is emitted so that there is always a component of the beam which will interact strongly with threat items in the pockets of the clothing or on the surface of the person.

Therefore, the present specification discloses a microwave based ultra wide band threat detection system that allows for active real-time detection of threat devices and materials concealed on or around people at ultra-low radiofrequency power densities while the passenger remains clothed in jackets, belts, hats and shoes without the need to divest.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein.

DETAILED DESCRIPTION

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention. In the description and claims of the application, each of the words "comprise" "include" and "have", and forms thereof, are not necessarily limited to members in a list with which the words may be associated.

Figure 1:
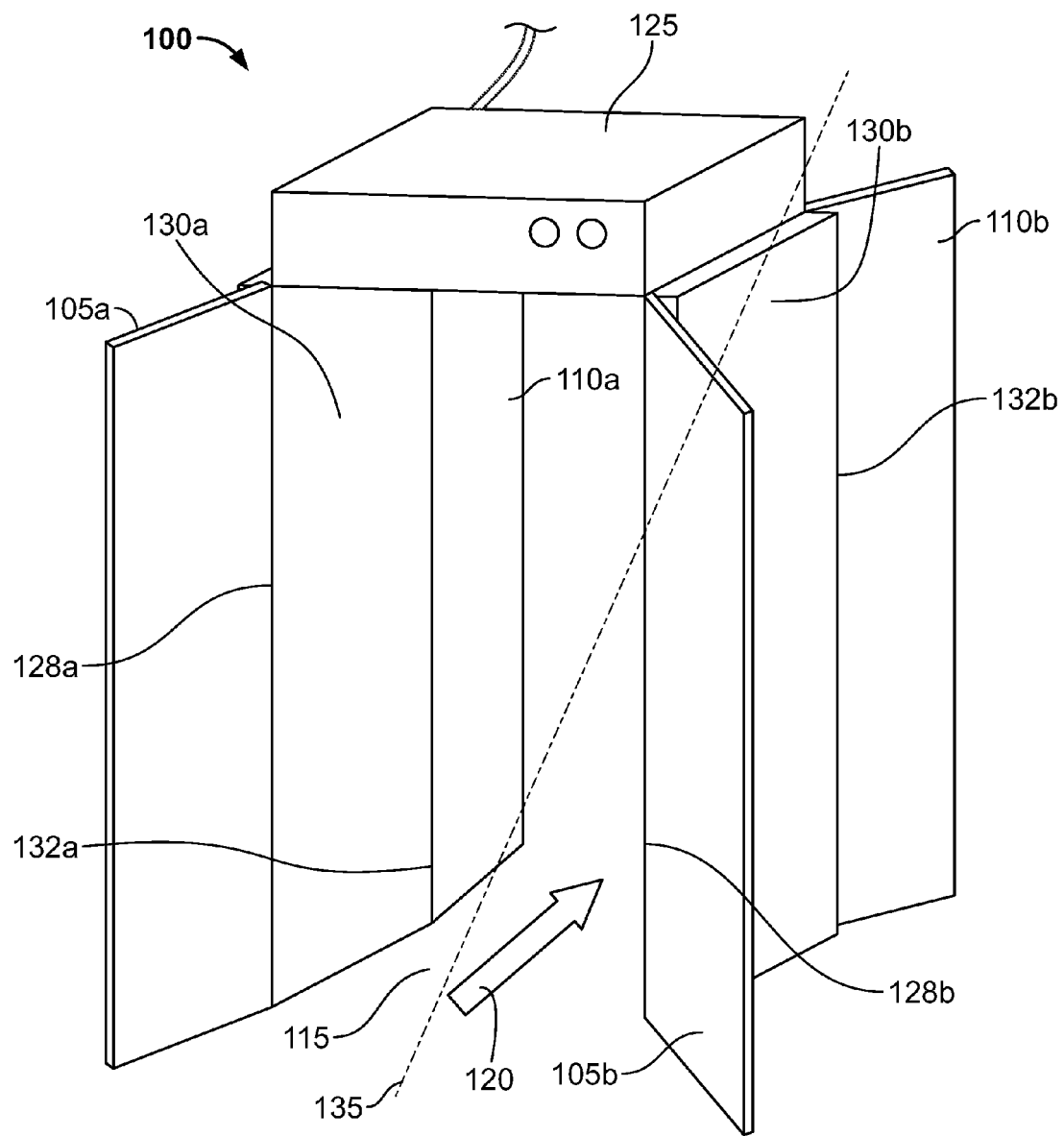
FIG. 1 shows an embodiment of an ultra-wide band microwave based scanning/imaging system suitable for use in screening passengers in an airport environment.

FIG. 1 shows an embodiment of an ultra-wide band microwave based scanning/imaging system 100 suitable for use in screening passengers in an airport environment without requiring a passenger to divest themselves of garments or accessories. The system 100 is configured, in one embodiment, in the form of a walk through portal or archway comprising a first set of two opposing detection panels 105a, 105b that form a substantially 'V' or 'funnel' shaped entrance 115, a second set of two opposing detection panels 110a, 110b that also form a substantially 'V' or 'funnel' shaped exit 120, a third set of two opposing detection panels 130a, 130b that form the two sides of the central portal/region between the first and second sets, and an optional roof, cover or hood 125. In accordance with an embodiment, the first, second and third sets of detection panels 105a, 105b, 110a, 110b, 130a, 130b comprise a plurality of transmitting and receiving elements Tx/Rx. The system 100 is enabled for walk through operation such that the side panels 130a, 130b and entrance/exit panels 105a, 105b, 110a, 110b are taller relative to the passenger passing through them. In various embodiments, each panel (105a, 105b, 110a, 110b, 130a, 130b) is approximately 2 m tall and has a width ranging between 0.4 m and 1.0 m.

In some embodiments, the substantially 'V' or 'funnel' shaped entrance 115 and exit 120 are formed by the first and second sets of detection panels 105a, 105b and 110a, 110b that are installed, located or positioned at a 'panel angle' with reference to a central longitudinal axis 135 along the direction of motion of the passenger through the portal. In some embodiments, the first and second panels 105a, 105b of the entrance funnel 115 are positioned at a 'panel angle' with reference to the respective front ends 128a, 128b of the panels 130a, 130b of the central portal. Similarly, the first and second panels 110a, 110b of the exit funnel 120 are positioned at a 'panel angle' with reference to the respective back ends 132a, 132b of the panels 130a, 130b of the central portal. Thus, the central portal is located between the entrance and exit funnels 115, 120 such that the left and right panels 130a, 130b (forming the left and right sides) of the central portal/region are configured parallel to each other.

It should be appreciated that the selection of the 'panel angle', at which the panels 105a, 105b, 110a, 110b are positioned with reference to the central longitudinal axis 135 and/or the front and back ends of the panels 130a, 130b of the central portal, depends on optimizing a plurality of factors such as, but not limited to, the angular divergence of the transmitter/receiver elements (the wider the divergence angle of the transmitter/receiver elements, the shallower the 'panel angle'), the maximum allowable width of the portal/system 100 (that is typically dictated by physical layout of the inspection portal) and the uniformity of surface coverage of the passenger under inspection (recognizing that the entry panels 105a, 105b scan the front surface of the passenger's body, the central panels 130a, 130b scan the sides of the passenger's body and the exit panels 110a, 110b scan the rear of the passenger's body). In various embodiments, the 'panel angle' ranges between 5 to 80 degrees, preferably 20 to 60 degrees.

In operation of the ultra-wide band microwave based imaging/scanning system 100, the passenger (not shown) walks towards the two detection panels, 105a and 105b. When the passenger is at a distance from the entrance 115, a transmitting element (Tx) on one side, i.e. on panel 105a, of the entrance 115 will result in interacted beams being directed towards receiving elements (Rx) on both sides (panels 105a and 105b) of the entrance 115. As the passenger approaches the entrance 115, the distribution of interacted beams is directed more to the panel from which the transmitted beam originated. So, at a distance, the front of the passenger is scanned and as the passenger enters and walks through the panels 105a, 105b, the majority of the interactions are due to the two sides of the passenger. Thus, as the passenger walks through the scanning system 100, the amount of signal transmitted to opposing panels or reflected back to the same panel changes. With no passenger in the system 100, all signals are due to the beams transmitted from one panel to another. However, when the passenger is in the system 100, a fraction of the signal is reflected/scattered, e.g. from the front surface of the passenger's chest, between opposing entrance panels 105a, 105b or the whole signal is reflected/scattered back to the same panel (e.g. from the sides of the passenger's arms from/to the central side panels 130a, 130b). As shown in FIG. 1, the passenger then enters the exit 120, comprising detection panels 110a and 110b, which first gains information about the two sides of the passenger and then gains information from the rear surface of the passenger. In this way, a full surface scan is obtained over the 3D shape of the passenger, since all of the transmitted and received data is preferably time stamped, thereby allowing each data set to be organized in relative order.

In order to optimize the collection/detection of scan data, it is advantageous to select the most appropriate/optimal set of transmission/receiver pairs for each position of a passenger within the system 100. This appropriate/optimal set of transmission/receiver pairs varies depending on both the shape of the passenger and the position of the passenger within the system 100. Therefore, in some embodiments, the appropriate/optimal set of transmitter/receiver pairs is pre-estimated and/or pre-calculated based on passenger shape and position for determination of object property at each location within the scanning system 100 and then just these pairs are selected for subsequent data analysis.

It would be evident to those of ordinary skill in the art that as the passenger walks through the system 100, the position of each interacting surface on the passenger changes continually. Therefore, in accordance with an aspect of the present specification, the passenger or the detection space and/or region (that is, the passage defined by the first, second and third sets of detection panels) is scanned or sampled multiple times during the transit of the passenger through the system 100. Since data collection for each transmitter pulse with parallel data collection on all receivers occurs in time periods of nanoseconds (and less than 100 ns) and there are typically 100 to 1000 transmitter elements in the system 100, it is possible to complete data collection in time periods of less than 1 millisecond. The complete data collection operation may be understood to generate a "frame" of data. In accordance with an aspect, for each transmitter, a plurality of scan data measurements or repeat/multiple scan data measurements are taken to gain improved signal to noise ratios while the overall frame rate is maintained at a value between 5 and 100 frames per second. Accordingly, with a passenger walking at speeds between 0.2 and 2 m/s, the system provides at least 5 inspection frames per second for a fast walking passenger, with high signal to noise ratio signal acquisition, and over 100 frames per second for a slow moving passenger, with reduced signal to noise ratio signal acquisition. At these frame rates, the system 100 captures a high integrity data set multiple times for a moving passenger, thereby enabling an effective walk through system as opposed to a static "pose and scan" system known in the art.

Thus, in accordance with an aspect, the system 100 operates in multi-frame inspection mode wherein a plurality of scan data sets are collected for the passenger as he passes through the portal to provide several measurements of threat type and location and to enable probing of hidden or difficult to scan locations/regions on the passenger's body.

Figure 2:
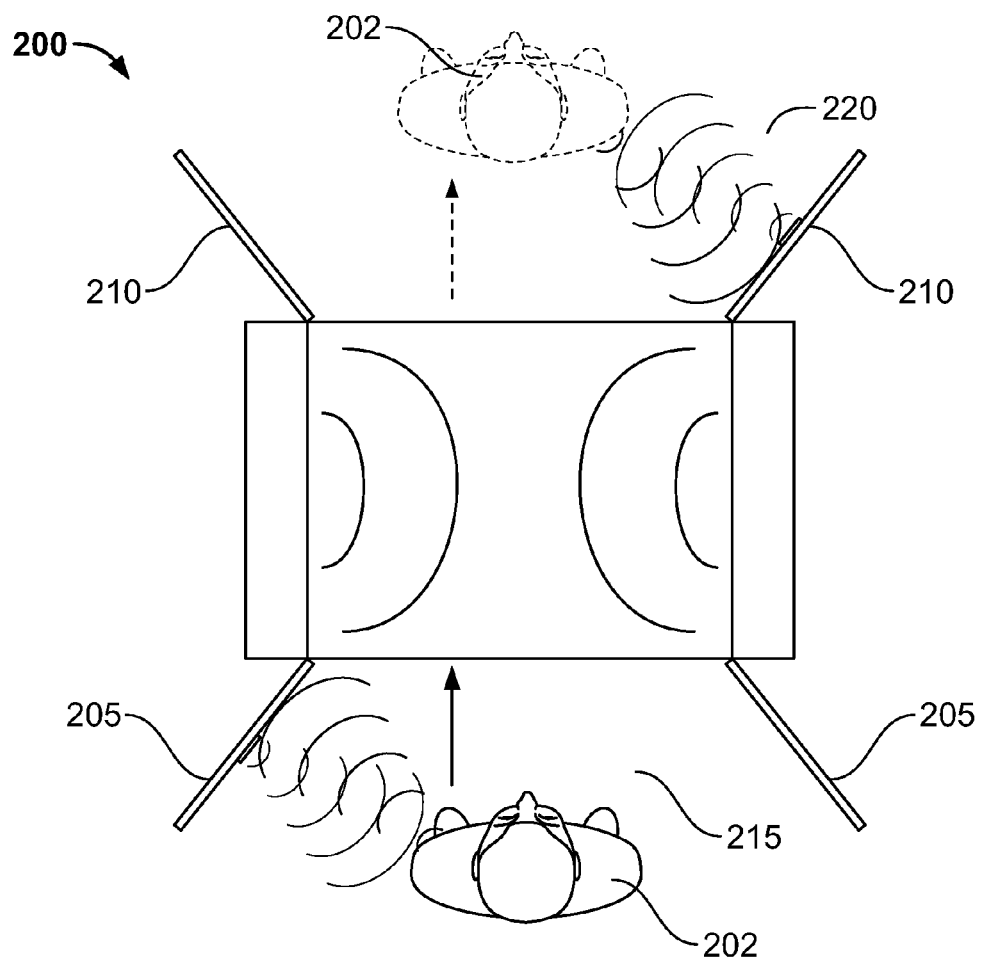
FIG. 2 shows a plan view of the system shown in FIG. 1.

FIG. 2 shows a plan/top view of the scanning/imaging system 200 as the passenger 202 walks through the scanner 200 which clearly shows the two 'V', angled or funnel shaped scanning regions—at entrance 215 and exit 220. The passenger 202 approaches from the bottom of the FIG. 2 and walks at normal speed towards the top of the FIG. 2. RF transmit/receive elements on door-sized panels 205, 210 project beams towards the front of the passenger 202 as they walk into the screening device 200 and towards the back of the passenger 202 as they exit the screening device 200.

Figure 3:
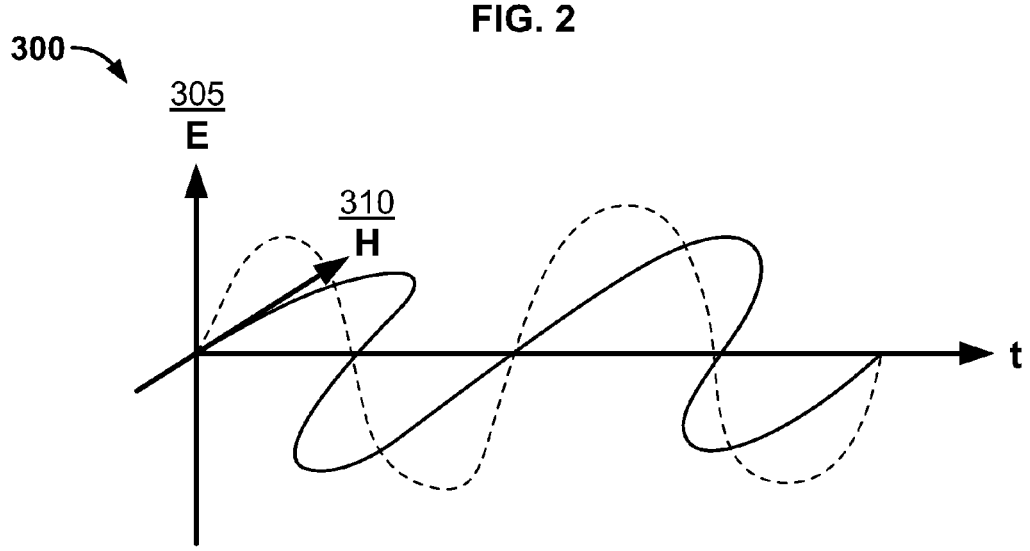
FIG. 3 shows a representation of a radio frequency beam with both electric (E) and magnetic (H) components in orthogonal directions which propagate along through time (t)

FIG. 3 shows a representation of a radio frequency beam with both electric (E) and magnetic (H) components 305, 310 in orthogonal directions which propagate along through time (t). As shown in FIG. 3, via graph 300, it is known to persons of ordinary skill in the art that electromagnetic radiation of a given frequency comprises electric (E) and magnetic (H) field components 305, 310 which propagate in the same direction with the two vector components 305, 310 of the radiation being in orthogonal directions. When such electromagnetic radiation interacts with material through scattering processes, the relative phase and amplitude of the E and H components 305, 310 of the radiation beam are affected by the specific type of material properties (dielectric constant $\in$, conductivity $\sigma$ and permeability $\mu$) and the nature of the interaction (surface or bulk).

Figure 4A:
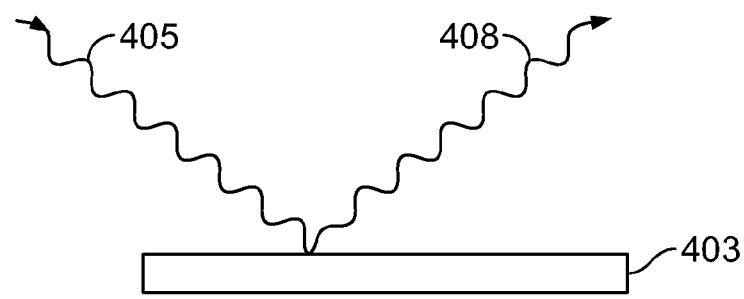
FIG. 4A shows a high frequency (millimeter wave or terahertz) beam reflecting from a threat sized object.

FIG. 4A shows a high frequency (millimeter wave or terahertz) electromagnetic radiation incident beam 405 reflecting from a threat sized object (such as, for example, a passport, mobile phone, coins, etc.) 403. Here the wavelength of the radiation beam 405 is small compared to the object 403 as a result of which the only interaction that occurs is at the surface of the object 403 and therefore no material information is obtained from the interacted beam 408. Persons of ordinary skill in the art would appreciate that surface interactions dominate when the wavelength of the electromagnetic radiation, impinging an object, is small compared to the dimensions of the object that it is interacting with. Given that:

$$c=f\lambda$$

where c=speed of light, f=frequency of the radiation and $\lambda$=wavelength of the radiation, then one can calculate frequency for a plurality of relevant wavelengths, as follows:

| Wavelength (cm) | Frequency (GHz) |
| --- | --- |
| 1 | 30 |
| 2 | 15 |
| 5 | 6 |
| 10 | 3 |
| 20 | 1.5 |
| 50 | 0.6 |

For known millimeter wave-based imaging systems using radiation having a frequency of the order of 100 GHz, the associated wavelength is only a few millimeters and so almost all interactions with threat and innocuous objects (e.g. passport, mobile phone, coins, etc.) will be attributable to the surface only. Thus such systems are able to create images of objects, but these images convey little material data, other than that a discontinuity in permittivity is detected.

Figure 4B:
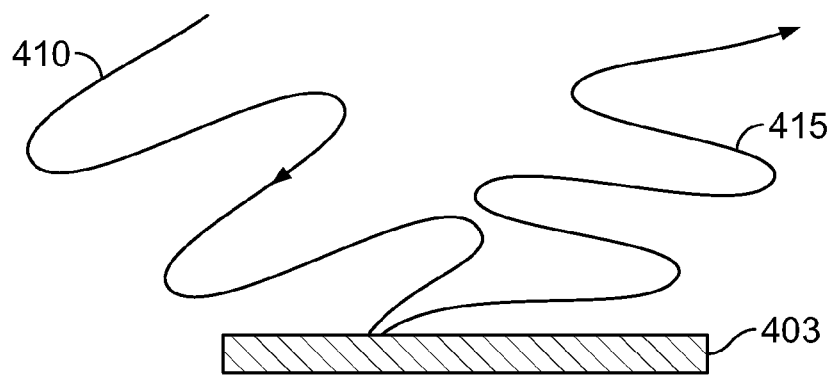
FIG. 4B shows a lower energy (microwave) beam interacting with the threat sized object.

FIG. 4B shows a lower energy (microwave) incident beam 410 interacting with the threat sized object 403. Here, the wavelength is substantially similar (or comparable) to the size of the threat and innocuous object 403 (e.g. passport, mobile phone, coins, etc.) and as a result there is a strong interaction in the bulk of the object 403 between the incident beam 410 and the interacted beam 415. Thus, when the wavelength of the interacting electromagnetic radiation is close to the dimensions of the bulk object there is a strong coupling between the incident radiation 410 and the object 403, as shown in FIG. 4B, and the interaction affects the phase of the E and H components as well as the amplitude of the incident electromagnetic radiation 410 as observed through the scattered signal 415 at that frequency. In the present specification, this bulk material interaction is exploited in creating a threat signature. From the above table, it is seen that a system operating with frequencies in the range 2 GHz to 20 GHz is suitable for detection of a plurality of threat items.

Figure 5:
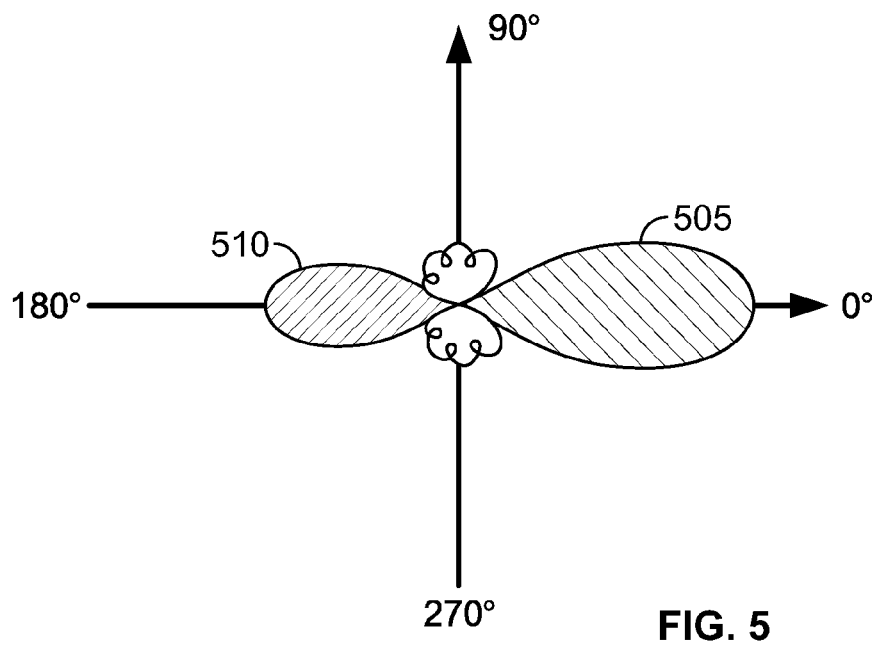
FIG. 5 shows a typical radiofrequency beam produced by a directional antenna.

FIG. 5 shows a typical radiofrequency beam produced by a directional antenna. The main signal of interest 505 propagates in the 0 degree direction while a back lobe 510 is produced in the 180 degree direction. Here, the primary beam 505 is formed in the forward direction although a significant beam 510 is also propagated in the reverse direction. It is known that a diameter and shape of the antenna affects the focusing of the electromagnetic beam—the larger the diameter the better is the focus. In the imaging/scanning system of the present specification, the diameter of the antenna is relatively small (typically ranging from 1 cm to 10 cm) so that the formed beam is relatively unfocussed in order to irradiate a reasonable area of the passenger with position location of threat objects being (carried on the passenger) reconstructed through the time domain nature of a data acquisition and signal processing circuit/system, such as circuit/system 1000 of FIG. 10 described later in this specification. In various embodiments, a blocking (radiation absorbing) screen may be placed behind the antenna to prevent radiation interactions with objects that are not in the primary field of view of the antenna.

In accordance with an aspect of the scanning/imaging system of the present specification, the transmitting and receiving antenna elements are configured to give optimal area coverage of the passenger under inspection in order to minimize regions of the passenger where no signal can be detected. To achieve optimal surface area coverage of the passenger under inspection, a plurality of transmitters are employed, each of which is activated to irradiate different parts of the passenger. In parallel, a plurality of large area array of receivers is used to collect scattered radiation corresponding to radiation beams emitted from each of the activated transmitter elements. It is from a plurality of measurements determined from the collected scattered radiation that a threat signature is reconstructed, segmented and classified.

Figure 6:
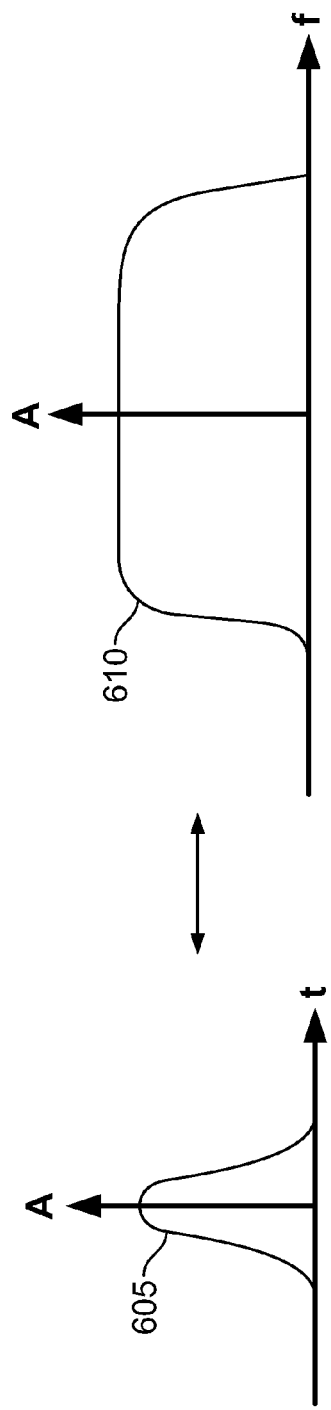
FIG. 6 shows a short Gaussian-like pulse of radiofrequency power in the time domain which maps to a broad wide band pulse of radiofrequency power in the frequency domain.

FIG. 6 shows a short Gaussian like pulse 605 of radiofrequency power in the time domain (left hand side) which maps to a broad wide band pulse 610 of radiofrequency power in the frequency domain (right hand side), of typical duration less than 1 ns. In frequency space, the pulse equates to a wide Gaussian extending out to many GHz in cut-off frequency. This stimulating pulse 605, when applied to a suitable antenna with broad frequency response, provides an ultra-wide band microwave beam (for use in the scanning/imaging system of the present specification) which interacts with the passenger.

Since the pulse 605 is very narrow, the receiving antenna detects the arrival of the interacted beam pulse some time later due to the time of flight of the pulse which travels at the speed of light ($3 \times 10^8$ m/s in vacuum). For reference, a plurality of exemplary pulse delay times for a variety of total transit distances in vacuum are shown in the following table:

| Distance (cm) | Time (ns) |
| --- | --- |
| 2 | 0.1 |
| 5 | 0.3 |
| 10 | 0.7 |
| 20 | 1.3 |
| 50 | 3.3 |
| 100 | 6.7 |

Figure 7:
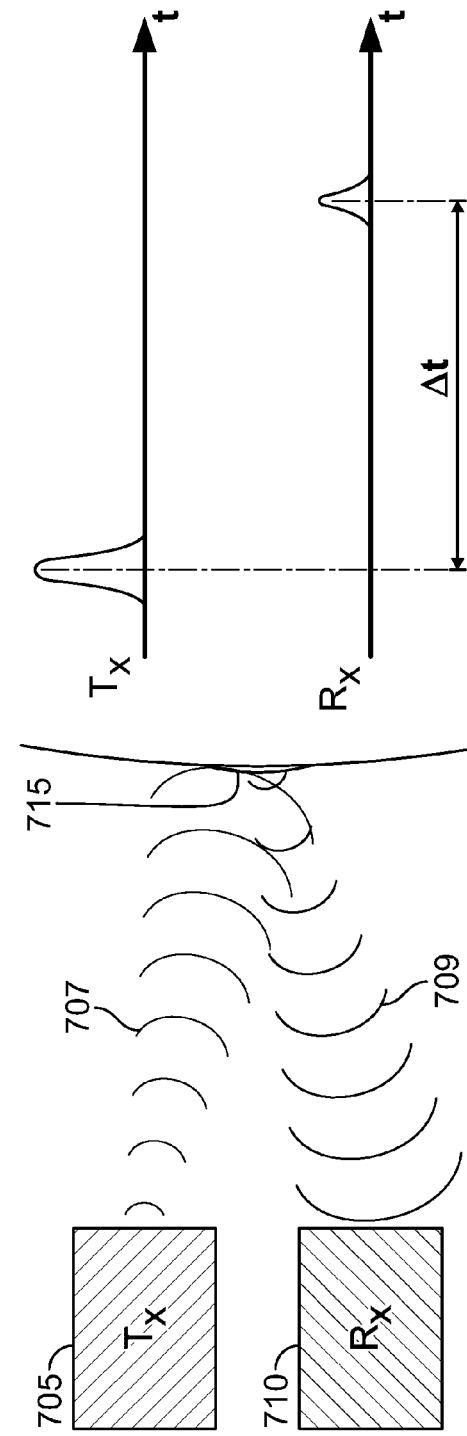
FIG. 7 shows a transmitting antenna (Tx) projecting a beam of microwave energy towards a surface of a person with a threat object located on the front of the person.

A detector with time resolution of 20 ps will give spatial position accurate to just a few millimeters. A schematic illustration of a signal collection system is shown in FIG. 7. FIG. 7 shows a transmitting antenna (Tx) 705 projecting a beam 707 of microwave energy towards the surface on a person 715, in front of which is located a threat object (not shown). Interacted signals 709 scatter from the threat object (not shown) on the person 715 back to a receiving antenna (Rx) 710. The transmitted pulse 707 gives rise to a received pulse 709 which arrives back at the receiver 710 a time delay, Δt, after it was transmitted.

The signal collection system of FIG. 7 shows a single transmitting element, Tx, 705 that generates a short RF pulse 707 at time t=0. The pulse 707 propagates to the object where the beam 707 interacts and returns to a receiving element Rx 710 which produces a pulse at some time Δt later. However, the ultra-wide band microwave based imaging system 100 of FIG. 1, employs a plurality of receiving elements and acquires a plurality of data points corresponding to the time of the returning pulse that is recorded on each of the plurality of receiving elements in parallel. Geometry allows triangulation of the interaction site from the plurality of data points. In a more complex situation, such as that of scanning a passenger using the ultra-wide band microwave based imaging system 100 of FIG. 1, where there are more than one interacting objects (for example, surface of the passenger's body and a threat object in a pocket at some distance from the surface of the passenger's body), multiple pulse interactions are seen, for example one from the front surface of the threat object, another one from the rear surface of the threat object and yet another one from the surface of the passenger's body.

Since the velocity of propagation of the RF beam through the threat object is dependent on its dielectric property (the velocity of propagation is slowed as it passes through the object), the surface of the passenger's body appears to be indented behind the object in direct proportion to the relative permittivity/dielectric property of the threat object. This information is used in reconstructing the threat location, shape, size and type in subsequent signal analysis procedures. In accordance with an embodiment, a projection of ultra wide band radio frequencies from each transmitter element to the array of detection/receiver elements allows the physical location and dimensions of a potential threat object located in a pocket or on the surface of the body of the passenger to be determined using simple ray tracing methods known to persons of ordinary skill in the art. Alternately, in the frequency domain, it is known to persons skilled in the art that the strongest interaction of a radio frequency signal with a dielectric object occurs at an integer divisor of the wavelength of the RF beam. Therefore, in one embodiment, the dimension of an object is determined by spectral analysis of the reflected RF beam—wherein a plurality of notches due to object attenuation is characteristic of the dimensions of the object.

For an RF beam incident, normal or nearly normal, to the potential threat object, a part of the beam is scattered from the front surface of the object and a part of the beam propagates through the threat object, generating a secondary reflection from the conductive surface of the passenger's body (that is, from the rear surface of the threat object). The signal reflected from the body surface propagates back through the threat object and thereafter to the receivers. The reflected signal reaching the receivers after passing through the threat object is delayed compared to the signal reaching the receivers from regions adjacent to the front surface of the threat object. The extent of the time delay is dependent on, at least, (1) the physical thickness of the threat object (the larger the thickness, the longer the delay), and (2) the dielectric constant of the threat object (the greater the relative permittivity of the object, the longer the delay). In accordance with an embodiment, by normalizing the reflected signal by the measured thickness of the threat object (as determined from line of sight, for example), the relative permittivity of the potential threat object is determined.

In an alternate data acquisition method, signal collection is performed in the frequency domain. Here, a continuous wave sinusoidal signal is passed to the transmitting antenna, Tx, and a beam is formed which interacts with the object under inspection. The interacted beam is detected at a receiving antenna, Rx, where the received signal is mixed with the transmitted signal and an intermediate frequency reference signal. A band pass filter is applied around the reference frequency and the resulting modulated waveform phase and amplitude is sampled by a standard low frequency analogue-to-digital converter (ADC) in order to determine the type of interaction in the object. By sweeping the transmitted beam frequency, it is possible to measure interaction over a range of length scales and hence build up a clear picture of the objects with which the beam is interacting.

In the ultra-wide band microwave based imaging system 100 of FIG. 1, there are a plurality of transmitters and a plurality of receivers, and from the phase and amplitude data at each base frequency, the 3D location of each threat object, as well as the body surface of the passenger, is determined. This is advantageous in that many transmitters can be active simultaneously, each operating within a different part of the relevant microwave frequency spectrum.

In a further embodiment, alternative techniques such as pseudo random binary sequences are employed to obtain a time domain response (obtained by cross-correlating the received signal via a limited resolution, high speed, ADC with the transmitted binary code).

It should be obvious to those skilled in the art that alternative data collection methods may also be employed and these are included within the scope of this specification. For example, directional steering of a limited number of transmitter beams can be employed in place of simple switching of a large number of fixed transmitter beams.

While a plurality of types of antennas can be advantageously employed in the scanning/imaging system of the present specification, the desirable properties of the antennas include sufficiently ultra wide bandwidth, wide angle transmission, defined direction and nature (circular or linear) of polarization, well defined phase center such that different frequency components emanate from the same localized point source, and ease of fabrication which is compatible with standard electronic assembly techniques. The antenna should also be compatible with the data collection method employed, for instance time domain collection methods require an antenna with a narrow impulse response and negligible ringing. It shall be obvious to those skilled in the art that alternative antenna geometries may also be employed and these are included within the scope of this specification. Examples of possible antennas types for the sake of illustration include, but are not limited to, horns, Vivaldi configurations, cones, loaded dipoles, and spirals.

In order to maximize the computational efficiency and absolute accuracy of the threat reconstruction algorithms, the scanning/imaging system of the present specification utilizes an optimal layout of transmitting and receiving antennas. Either a) regularly spaced antennas, in which each antenna can be switched between receiver and a transmitter mode, or b) alternate pseudo-random arrays can be employed. Both types of array have their advantages and disadvantages. Regular arrays provide more straightforward implementation from a manufacturing perspective but provide limitations in the projection data set from which threat location and type are reconstructed. In contrast, pseudo-random arrays are harder to manufacture, but provide greater variety in the projection data set which assists in accurate threat reconstruction.

In accordance with another aspect, the scanning/imaging system of the present specification uses an optimal scanning sequence. For example, it is necessary to decide whether only one transmitter should be enabled at any one time, or whether transmitter activity should be interleaved in time, frequency, location or all of these at once. Interleaving in time is beneficial if the associated electronics data acquisition system results in a "dead time" whereby a given transmitter needs to be disabled while the data is being read out from receiving elements. Interleaving in frequency is beneficial when frequency domain data collection is used. Interleaving by location is beneficial when transmitting elements are widely spaced, such as at the head and feet of a passenger under inspection where signal cross-talk from the two beams (first beam directed to the head and second beam directed to the feet) in time domain sampling mode do not overlap simply because the time taken for any interacted signal to reach a receiver due to the first and second beams are different.

Parallel data collection, whereby more than one transmitter is activated at any one time, or time period in the case of temporally interleaved transmitters, is beneficial in terms of generating rapid scanning times when the number of transmitting elements becomes large.

Figure 8:
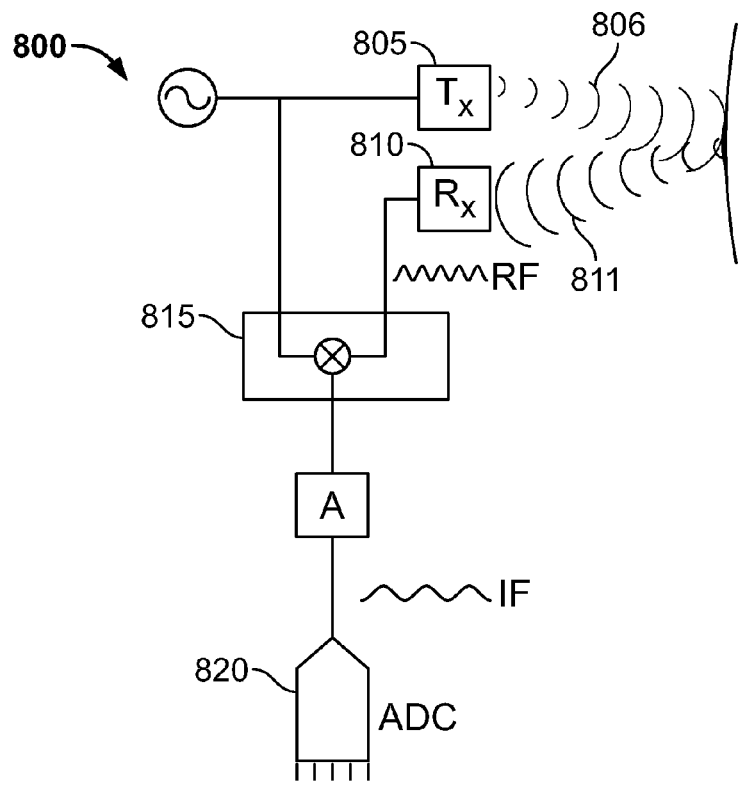
FIG. 8 shows a vector network analyzer in which a transmitted beam, Tx, is mixed with the received beam, Rx, through an intermediate frequency phase and amplitude detector.

FIG. 8 shows an embodiment of a vector network analyzer 800 in which a transmitted beam 806, from a transmitter element Tx 805, is mixed with the received beam 811, by a receiver element Rx 810, through an intermediate frequency phase and amplitude detector 815 where a low frequency analogue-to-digital converter (ADC) 820 is used to record the phase and amplitude information between the transmitted and received microwave signals 806 and 811 respectively.

Figure 9:
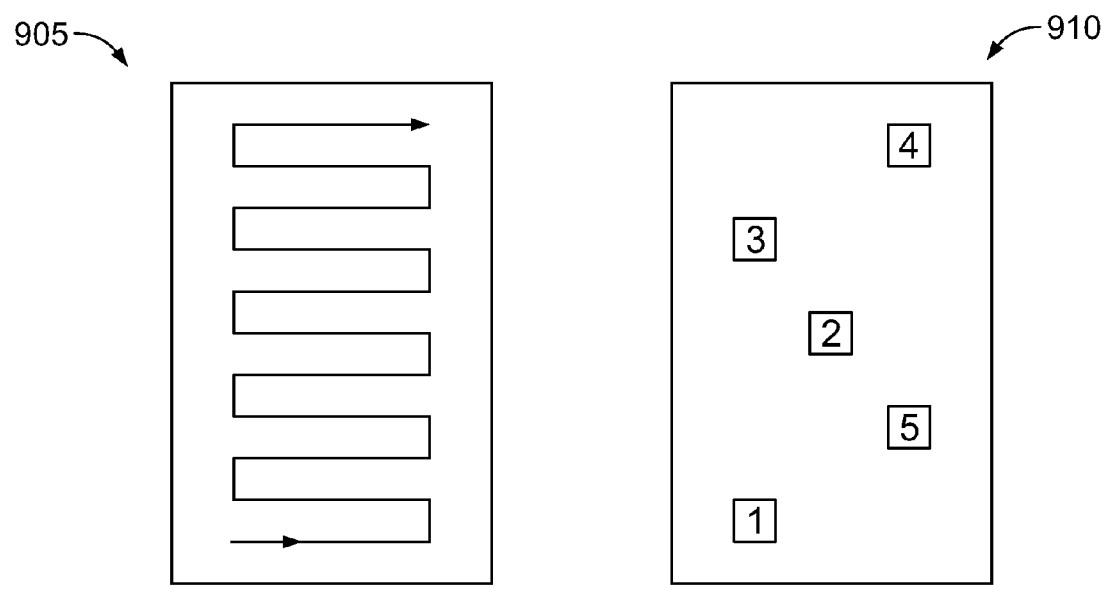
FIG. 9 shows transmitter sequencing patterns over door-sized arrays of antennas panels.

FIG. 9 shows transmitter sequencing patterns over door-sized arrays of antennas panels (such as panels 105, 110 and 130 of scanning/imaging system 100 of FIG. 1), in accordance with an embodiment. To the left, is shown a sequential raster pattern from lower left to upper right of the panel 905. To the right, the first few locations for a pseudo random transmit pattern are shown on panel 910. Thus, panel 905 provides an example of a raster scanned pattern in which transmitters are activated in sequence from the bottom left of the panel 905, containing multiple transmitter/receiver elements, to the top right. Such a scanning sequence is desirable for detecting threats on stationary passengers. However, when a passenger to be scanned is walking, it is advantageous to use the quasi-random pattern exemplified in panel 910 since this provides a better sampling of the four dimensional (x, y, z, t) projection space with less correlation between the trajectory of the passenger and the trajectory of the beams passing from transmitter to antenna. Accordingly, a preferred embodiment of the present specification uses the quasi-random or non-contiguous pattern of transmitters on the detector panels.

In either scanning mode, it is also possible to apply parallel data collection methods with more than one active transmitter in order to maximize the overall data collection efficiency of the scanning/imaging system of the present specification.

Figure 10:
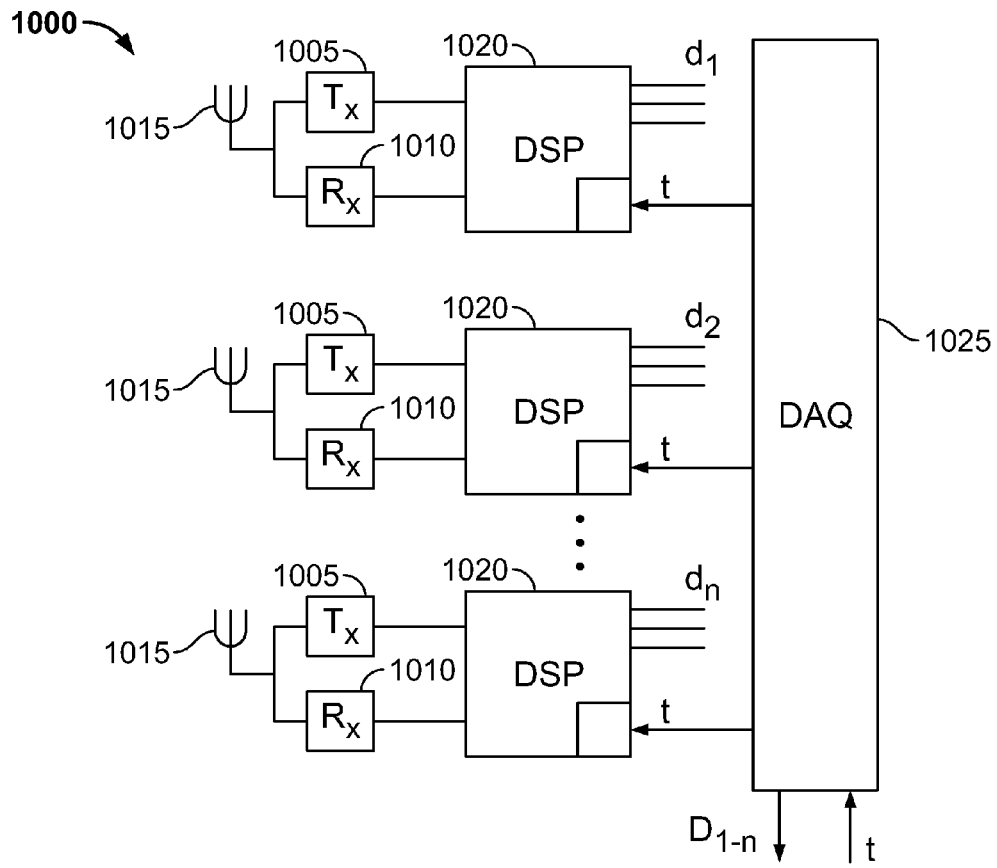
FIG. 10 shows an exemplary data acquisition system architecture for the ultra-wide band microwave based scanning/imaging system of FIG. 1.

FIG. 10 shows an embodiment of a data acquisition system or circuit 1000 for the imaging/scanning system of the present specification. In this embodiment, transmit (Tx) and receive (Rx) amplifiers are connected to a common antenna. While transmitting, the receiver channel is disconnected. The Tx/Rx amplifiers are connected to individual digital signal processing (DSP) blocks which receive precise timing and phase control information from a host data acquisition system (DAQ). Processed data from the DSP blocks is managed by the DAQ and results in high bandwidth projection data being generated which is passed to a threat reconstruction and detection processor for analysis.

Referring now to FIG. 10, each antenna 1015 is connected to a transmitter circuit 1005, Tx, and a receiver circuit 1010, Rx. The receiver circuit 1010 includes a switch in series with its input to disconnect the receiver input circuitry when the transmitter is active. Similarly, the transmitter includes a switch in series with its output to disconnect it from the antenna when it is not active so that it does not load the receiver input circuits. Amplifiers of the Tx and Rx circuits 1005, 1010 are connected to a digital signal processor (DSP) 1020, one DSP 1020 for each Tx/Rx pair. The DSP element 1020 is typically formed from digital and analogue circuits including analogue-to-digital converters, digital-to-analogue converters, field programmable gate arrays, microprocessors and full custom mixed signal integrated circuits. The function of the DSP 1020 is to generate the transmitter output signals, to condition and process the receiver input signals and to provide a digital output projection data stream that conveys the time, phase or frequency domain information, about the interacted beams, necessary for an efficient implementation of subsequent threat reconstruction algorithms. A high bandwidth data acquisition system (DAQ) 1025 manages the collection of projection data from each Tx/Rx pair 1005, 1010 and provides precise timing information, t, to ensure accurate synchronization of each system element. As is generally the case for high speed timing systems, the DAQ 1025 takes an input time stamp, generally a precise clock with low timing jitter at relatively low frequency and self-calibrates the time presented by each Tx/Rx unit 1005, 1010 by sending out known times, t, and then recording the time at which a return message was received back to the DAQ 1025, the time offset then being taken at half this total loop time.

There are always likely to be some surface areas that are harder to penetrate than others (e.g. between the thighs of the passenger as they walk through the scanner) and so particular attention must be paid to effectively scan these regions. Accordingly, in various embodiments, a plurality of scan data sets are collected for the passenger as he passes through the scanning/imaging system of the present specification (FIGS. 1 and 2). Each scan comprises data corresponding to different parts of the body (e.g. arms swinging past the torso) of the passenger. The data from each of these scan data sets are advantageously combined to give full body coverage.

Additionally, the beam from the transmitting and receiver elements utilizes wide beam angles enabling the scanning/imaging system of the present specification to provide improved/effective scanning of concave features/regions on the body of the passenger as he walks through angled or funnel shaped entrance and exit regions (215, 220 of FIG. 2) of the scanning system. In various embodiments, the beam angle ranges between 10 and 80 degrees. Too narrow a beam results in very specular reflection which limits the success of algorithms used to process the images. Too broad a beam results in less power per unit area into the receivers which affects the signal to noise ratio.

Once the projection data has been acquired for a plurality of transmitter and receiver antennas at various time and frequency ranges, the next step is to reconstruct the location, orientation and material type of potential threat objects. This process is typically implemented in three stages:

1. 3D shape reconstruction from projection data
2. Segmentation of the 3D shape data into individual objects
3. Classification of the individual segmented objects into threat or non-threat categories In order to determine 3D shape information from the projection data set, various inverse problem solution techniques are adopted. For example, the projection data is arranged in matrix form for standard numerical matrix inversion. Alternatively, constrained iterative solver techniques may be employed which are generally more computationally efficient than basic matrix inversion.

In order to constrain the solver or matrix inversion problem, it is efficient to provide the algorithm with the three-dimensional shape of the passenger under inspection. This is efficiently achieved by using a video camera system in which a grid of infra-red beams is projected onto the surface of the passenger as they walk through the scanning/imaging system of the present specification and from the distortion of these beams which are observed by the video camera, a surface profile can be determined. Typically, two or more cameras are required to achieve a full 3D surface profile of the passenger. Other mechanisms are known to those skilled in the art, such as projecting divergent infra-red pencil beams onto the body surface and measuring the distance between interacting spots from these beams.

Figure 11:
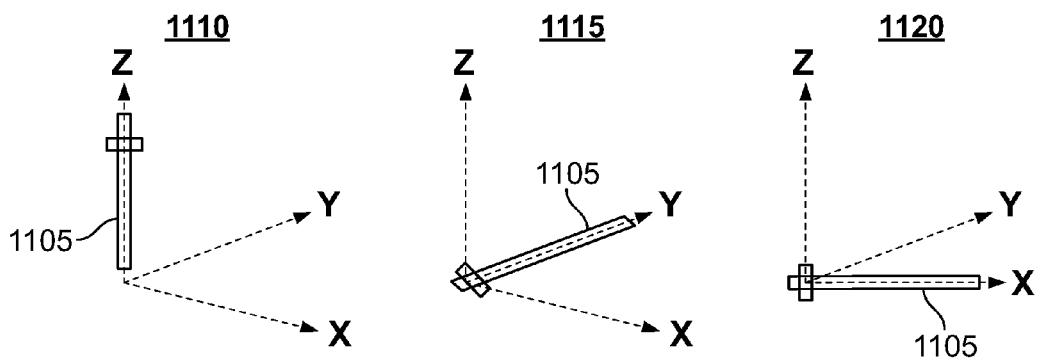
FIG. 11 shows how an object is represented in a three-dimensional field interaction depending on its orientation with respect to a Cartesian coordinate system; and, FIG. 12 shows how threat and innocuous items are displayed as icons on top of a live video image of the passenger as they walk through the scanning/imaging system of FIG. 1.

A threat object (carried on the passenger) is then described in terms of a suitable coordinate system, such as a 3D Cartesian matrix as shown in FIG. 11. Alternative systems, such as cylindrical coordinates, can also be useful. In case of the Cartesian coordinate system 1100 shown in FIG. 11, a knife 1105 can be seen to be long in one dimension (z-axis in coordinate system 1110, y-axis in system 1115 and x-axis in system 1120) but narrow in the others (x and y-axes in system 1110, x and z-axes in system 1115 and y and z-axis in system 1120). Taking into account phase and frequency information, as well as spatial information, the tensor properties of the object under inspection can be determined. The set of tensors that describe each segmented object are used in the classification stage to determine the significance of the threat (whether innocuous, benign, explosive, weapon) and the type of the threat (mobile phone, passport, explosive material, knife, etc.). Classification techniques such as the $k^{th}$ nearest neighbor (KNN), known to persons of ordinary skill in the art, may be used to determine the threat nature of the measured set of tensors and the residual error between the model and measurements can also be used to provide a confidence parameter on the classification.

Figure 12:
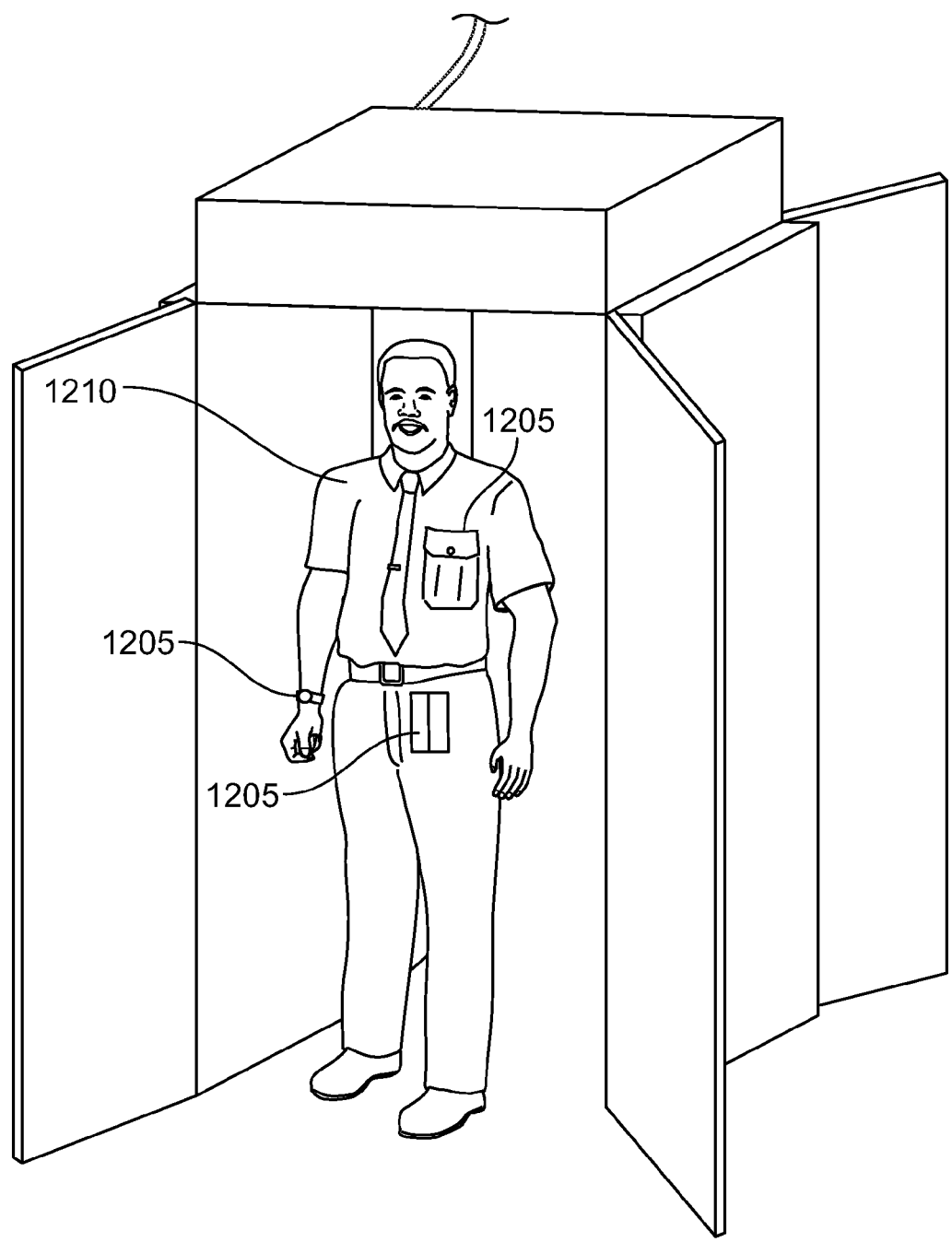

In a further aspect of the imaging/scanning system of the present specification, the threat data is presented to an operator in the form of one or more video images, or alternatively live video images, of the passenger as they walk through the scanning/imaging system with superimposed icons that show threat significance through their color (e.g. innocuous=green, benign=yellow, explosive=red, weapon=blue) and threat type through their shape (e.g. belt buckle icon, phone icon, bomb icon, pistol icon). FIG. 12 shows how threat and innocuous items (such as, but not limited to, belt buckle, mobile phone and watch) are displayed as icons 1205 on top of a live video image of the passenger 1210 as they walk through the scanning/imaging system of the present specification. FIG. 12 shows, as an example, the passenger 1210 wearing an electronic watch on their wrist with a belt holding up their trousers and a mobile phone in their breast pocket—all being represented by icons 1205. These three icons 1205 are each be colored in green to indicate an innocuous item. Typically, the operator is presented with two video images, one to show the front of the passenger 1210 and the other to show the rear of the passenger 1210. Threat icons 1205 are displayed in the correct locations on the front or rear images as determined by the threat reconstruction process.

Referring back to FIG. 1, in high throughput scenarios, a video imaging system can also be used to separate out signals that arise from different passengers. For example, the scan for one passenger may be nearly complete as he exits the scanning/imaging system 100 while another passenger is almost through the funnel or V shaped entrance 115. By separating out the underlying projection data by passenger ID, it is possible to support scanning of multiple passengers in the same scanning/imaging system 100 at the same time as long as appropriate spacing (e.g. 1 m) remains between them.

As would be evident to those of ordinary skill in the art, the imaging/scanning system 100 is calibrated for removal of ambient noise, external stray high frequency electromagnetic fields, mobile phone signals, WiFi signals and other RF noise that may be present. Once the system 100 is calibrated, normalization routines are applied to correct for systematic system variables, such as timing corrections, Tx and Rx gain variations and circuit jitter. Such corrections (calibration and normalization) are applied, in an embodiment, within the DSP blocks 1020 shown in FIG. 10.

The above examples are merely illustrative of the many applications of the system of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A portal for scanning a passenger walking through an inspection region along a longitudinal axis, wherein the passenger is carrying at least one object on the passenger's body, the portal comprising:
    a funneled entrance comprising a first set of two opposing panels installed at a first angle to the longitudinal axis, each of the first set of two opposing panels comprising a first edge proximal to the center of the portal and a second edge distal to the center of the portal, a distance of the second edge from the longitudinal axis being greater than the distance of the first edge from the longitudinal axis for shaping said entrance as a narrowing funnel and thereby form the first angle, wherein the first angle is in a range of 5 to 85 degrees;
    a funneled exit comprising a second set of two opposing panels installed at a second angle to the longitudinal axis, each of the second set of two opposing panels comprising a first edge proximal to the center of the portal and a second edge distal to the center of the portal, a distance of the second edge from the longitudinal axis being greater than the distance of the first edge from the longitudinal axis for shaping said exit as an expanding funnel and thereby form the second angle, wherein the second angle is in a range of 5 to 85 degrees;
    a central portal comprising a third set of two opposing panels positioned parallel to each other and located between said funneled entrance and funneled exit, the funneled entrance and the funneled exit extending beyond the central portal in opposing directions, wherein the first, second and third sets of two opposing panels form the inspection region and comprise a plurality of transmitter elements to project microwave beams on the passenger as said passenger passes through the portal and a plurality of receiver elements to receive scattered microwave beams from the passenger, and wherein more than one transmitter element is active simultaneously and generates a plurality of scans of the inspection region while the passenger passes through the portal; and
    a plurality of processing blocks associated with said plurality of transmitter and receiver elements to process the scattered microwave beams and output data comprising at least one of a time, phase or frequency domain information, wherein the scattered microwave beams are a result of interactions of the projected microwave beams with an upper surface of the at least one object, a rear surface of the at least one object, and a portion of the passenger adjacent to the upper surface of the at least one object, and wherein said at least one of time, phase or frequency domain information is used to determine a location, shape, size or relative permittivity of the at least one object.

2. The portal of claim 1, wherein a value of the first and second angles are selected to optimize at least one of an angular divergence of the transmitter and the receiver elements, a maximum allowable width of the portal, and a uniformity of surface coverage of the passenger under inspection, said first and second angles being in a range of 20 to 60 degrees.

3. The portal of claim 1, wherein each panel of said first, second and third sets of two opposing panels is approximately 2 m tall and has a width ranging between 0.4 m and 1.0 m.

4. The portal of claim 1, wherein the first, second and third sets of two opposing panels are configured to scan a front surface, a rear surface and a plurality of side surfaces of the passenger.

5. The portal of claim 1, wherein said plurality of scans are generated at a rate ranging between 5 and 100 frames per second.

6. The portal of claim 1, wherein said microwave beams have frequencies ranging between 2 GHz and 20 GHz.

7. The portal of claim 1, wherein an antenna coupled to each of said plurality of transmitter and receiver elements has a diameter ranging between 1 cm and 10 cm.

8. The portal of claim 1, wherein said plurality of transmitter elements are activated in a sequential raster scan pattern.

9. The portal of claim 1, wherein said plurality of transmitter elements are activated in a pseudo random scan pattern.

10. The portal of claim 1, wherein said at least one object is displayed as an icon superimposed on a real-time video image of the passenger.

11. The portal of claim 10, wherein said icon is colored to indicate a threat status of said at least one object.

12. A method of scanning a passenger walking along a longitudinal axis of an inspection region of a portal, wherein the inspection region is defined by a central portal, an entrance funnel, and an exit funnel, wherein the central portal comprises a right panel and a left panel, said right and left panels opposing each other in a substantially parallel configuration, the entrance funnel and the exit funnel extending beyond the central portal in opposing directions, wherein the entrance funnel comprises a first set of two opposing panels installed at an angle of 5 to 85 degrees relative to the longitudinal axis, each of the first set of two opposing panels comprising a first edge proximal to the center of the portal and a second edge distal to the center of the portal, a distance of the second edge from the longitudinal axis being greater than the distance of the first edge from the longitudinal axis for shaping said entrance as a narrowing funnel, and wherein the exit funnel comprises a second set of two opposing panels installed at an angle of 5 to 85 degrees relative to the longitudinal axis, each of the second set of two opposing panels comprising a first edge proximal to the center of the portal and a second edge distal to the center of the portal, a distance of the second edge from the longitudinal axis being greater than the distance of the first edge from the longitudinal axis for shaping said exit as a narrowing funnel, the method comprising:
projecting RF beams on the passenger from a plurality of transmitter elements on each of the panels of said central portal, entrance and exit funnels, wherein more than one transmitter element is active simultaneously and generates a plurality of scans of the inspection region while the passenger transits through the portal;
receiving beams, scattered off the passenger, by a plurality of receiver elements on each of the panels of said central portal, entrance and exit funnels, wherein said scattered beams are a result of interactions of the projected RF beams with an upper surface and a rear surface of at least one object located on the passenger and with a surface on the passenger's body adjacent to the upper surface of the at least one object; and
processing the scattered beams, using a plurality of processing blocks associated with said plurality of transmitter and receiver elements, to output data comprising at least one of a time, phase or frequency domain information, wherein said at least one of time, phase or frequency domain information is used to determine a location, shape, size, or relative permittivity of the at least one object.

13. The method of claim 12, wherein the angle of installation of the first and the second set of two opposing panels with respect to the longitudinal axis ranges between 20 to 60 degrees.

14. The method of claim 12, wherein each panel of said central portal, entrance funnel and exit funnel is approximately 2 m tall and has a width ranging between 0.4 m and 1.0 m.

15. The method of claim 12, wherein the panels of said central portal, entrance funnel and exit funnel respectively scan a front surface, a rear surface and side surfaces of the passenger.

16. The method of claim 12, wherein said plurality of scans are generated at a rate ranging between 5 and 100 frames per second.

17. The method of claim 12, wherein said RF beams have frequencies ranging between 2 GHz and 20 GHz.

18. The method of claim 12, wherein an antenna coupled to each of said plurality of transmitter and receiver elements has a diameter ranging between 1 cm and 10 cm.

19. The method of claim 12, wherein said plurality of transmitter elements are activated in a sequential raster scan pattern.

20. The method of claim 12, wherein said plurality of transmitter elements are activated in a pseudo random scan pattern.

21. The method of claim 12, wherein said at least one object is displayed as an icon superimposed on a real-time video image of the passenger.

22. The method of claim 21, wherein said icon is colored to indicate a threat status of said at least one object.

23. A method of scanning a passenger walking along a longitudinal axis of an inspection region of a portal, wherein the inspection region is defined by a first, second and third sets of two panels each, and wherein the first and second sets of panels are installed at an angle of 20 degrees to 60 degrees to the longitudinal axis to respectively form an entrance and an exit of the portal, wherein the first set of panels comprises a first edge proximal to the center of the portal and a second edge distal to the center of the portal, a distance of the second edge from the longitudinal axis being greater than the distance of the first edge from the longitudinal axis for shaping the first set of panels as a narrowing funnel for entering into the portal defined by the third set of panels and wherein the second set of panels comprises a first edge proximal to the center of the portal and a second edge distal to the center of the portal, a distance of the second edge from the longitudinal axis being greater than the distance of the first edge from the longitudinal axis for shaping the second set of panels as an expanding funnel for exiting the portal, the first set of panels and the second set of panels extending beyond the central portal in opposing directions, the method comprising:
projecting RF beams on the passenger from a plurality of transmitter elements on said first, second and third sets of panels, wherein more than one transmitter element is active simultaneously and generates a plurality of scans of the inspection region while the passenger transits through the portal;
receiving scattered beams, from the passenger, by a plurality of receiver elements on said first, second and third sets of panels, wherein said scattered beams are a result of interactions of the projected RF beams from an upper surface and a rear surface of at least one object located on the passenger's body and from the passenger's body adjacent to the upper surface of the at least one object; and
processing the scattered beams, using a plurality of processing blocks associated with said plurality of transmitter and receiver elements, to output data reflective of a time difference between the scattered beams received from said upper surface and said rear surface of the at least one object, wherein said time difference is used to determine a relative permittivity of the at least one object.

24. The method of claim 23, wherein each panel of said first, second and third sets is approximately 2 m tall and has a width ranging between 0.4 m and 1.0 m.

25. The method of claim 23, wherein the first, second and third sets of panels respectively scan a front surface, a rear surface and sides of the passenger.

26. The method of claim 23, wherein said plurality of scans are generated at a rate ranging between 5 and 100 frames per second.

27. The method of claim 23, wherein said RF beams have frequencies ranging between 2 GHz and 20 GHz.

28. The method of claim 23, wherein an antenna coupled to each of said plurality of transmitter and receiver elements has a diameter ranging between 1 cm and 10 cm.

29. The method of claim 23, wherein said plurality of transmitter elements are activated in a sequential raster scan pattern.

30. The method of claim 23, wherein said plurality of transmitter elements are activated in a pseudo random scan pattern.

31. The method of claim 23, wherein said at least one object is displayed as an icon superimposed on a real-time video image of the passenger.

32. The method of claim 31, wherein said icon is colored to indicate a threat status of said at least one object.

33. A method of scanning a passenger walking along a longitudinal axis of an inspection region of a portal, wherein the inspection region is defined by a first, second and third sets of two panels each, and wherein the first and second sets of panels are installed at an angle to the longitudinal axis to respectively form an entrance and an exit of the portal, wherein the first set of panels comprises a first edge proximal to the center of the portal and a second edge distal to the center of the portal, a distance of the second edge from the longitudinal axis being greater than the distance of the first edge from the longitudinal axis for shaping the first set of panels as a narrowing funnel for entering into the portal defined by the third set of panels and wherein the second set of panels comprises a first edge proximal to the center of the portal and a second edge distal to the center of the portal, a distance of the second edge from the longitudinal axis being greater than the distance of the first edge from the longitudinal axis for shaping the second set of panels as an expanding funnel for exiting the portal, the first set of panels and the second set of panels extending beyond the central portal in opposing directions, the method comprising:

projecting RF beams on the passenger from a plurality of transmitter elements on said first, second and third sets of panels, wherein more than one transmitter element is active simultaneously and generates a plurality of scans of the inspection region while the passenger transits through the portal and wherein each panel of said first, second and third sets of panels is approximately 2 m tall and has a width ranging between 0.4 m and 1.0 m;

receiving scattered beams, from the passenger, by a plurality of receiver elements on said first, second and third sets of panels, wherein said scattered beams are a result of interactions of the projected RF beams from an upper surface and a rear surface of at least one object located on the passenger's body and from the passenger's body adjacent to the upper surface of the at least one object; and processing the scattered beams, using a plurality of processing blocks associated with said plurality of transmitter and receiver elements, to output data reflective of a time difference between the scattered beams received from said upper surface and said rear surface of the at least one object, wherein said time difference is used to determine a relative permittivity of the at least one object.

* * * * *